(12) United States Patent  
Onayama

(10) Patent No.: US 8,776,982 B2
(45) Date of Patent: Jul. 15, 2014

(54) ARTICLE SORTING EQUIPMENT

(75) Inventor: Manabu Onayama, Shiga (JP)

(73) Assignee: Daifuku Co., Ltd., Osaka (JP)

( * ) Notice: Subject to any disclaimer, the term of this patent is extended or adjusted under 35 U.S.C. 154(b) by 436 days.

(21) Appl. No.: 13/190,119

(22) Filed: Jul. 25, 2011

(65) Prior Publication Data

US 2012/0031731 A1 Feb. 9, 2012

(30) Foreign Application Priority Data

Aug. 4, 2010 (JP) ................. 2010-175404
Aug. 4, 2010 (JP) ................. 2010-175559
Aug. 4, 2010 (JP) ................. 2010-175621

(51) Int. Cl.
*B65G 47/46* (2006.01)
*B65G 47/84* (2006.01)
*B65G 43/08* (2006.01)

(52) U.S. Cl.
CPC .............. *B65G 47/844* (2013.01); *B65G 43/08* (2013.01)
USPC ................................................... 198/370.02

(58) Field of Classification Search
None
See application file for complete search history.

(56) References Cited

U.S. PATENT DOCUMENTS

| 4,884,677 | A | * | 12/1989 | Yu et al. ................... 198/370.02 |
| 4,915,209 | A | * | 4/1990 | Canziani ........................ 198/357 |
| 2007/0209906 | A1 | * | 9/2007 | Ranger et al. ............ 198/370.07 |
| 2008/0017476 | A1 |   | 1/2008 | Zeitler et al. |

FOREIGN PATENT DOCUMENTS

| EP | 0084905 | A2 | 8/1983 |
| JP | 58-162432 | A | 9/1983 |
| JP | S58-162432 | A | 9/1983 |
| JP | S61-027811 | A | 2/1986 |
| JP | H04-44225 | U | 4/1992 |
| JP | H05-069937 | A | 3/1993 |
| JP | H07-041160 | A | 2/1995 |
| JP | H07-315561 | A | 12/1995 |
| JP | H08-324770 | A | 12/1996 |
| JP | H10-114417 | A | 5/1998 |
| JP | 2002-193437 | A | 7/2002 |
| JP | 2007-119093 | A | 5/2007 |
| JP | 2009-249121 | A | 10/2009 |
| JP | 2009-249121 | A | 10/2009 |

OTHER PUBLICATIONS

Japanese Office Action of the corresponding Japanese Patent Application No. 2010-175404, Jan. 21, 2014.
Japanese Office Action of the corresponding Japanese Patent Application No. 2010-175559, dated Jan. 22, 2014.
Japanese Office Action of the corresponding Japanese Patent Application No. 2010-175621, dated Jan. 22, 2014.
Extended European Search Report of the corresponding European Application No. 11176406.4, dated Feb. 17, 2012.

* cited by examiner

*Primary Examiner* — Kavel Singh
(74) *Attorney, Agent, or Firm* — Global IP Counselors, LLP

(57) ABSTRACT

Article sorting equipment of the present invention comprises: a rotation drive device; endless chains rotated on a conveyance route by the rotation drive device; a plurality of slats on which the article is placed and conveyed; and shoes attached to the slats. In the present invention, detected plates are attached to the slats, and a detection device for detecting the detected plates is provided. Based on timing of detecting the detected plates, positions of the slats are obtained.

17 Claims, 18 Drawing Sheets

← Conveying direction

| | | | | | | | | | |
|---|---|---|---|---|---|---|---|---|---|
|0251|0252|0253|0254|0255|0256|0257|0258|0259|0260|
|0261|0262|0263|0264|0265|0266|0267|0268|0269|0270|
|0271|0272|0273|0274|0275|0276|0277|0278|0279|0280|
|0281|0282|0283|0284|0285|0286|0287|0288|0289|0290|
|0291|0292|0293|0294|0295|0296|0297|0298|0299|0300|
|0301|0302|0303|0304|0305|0306|0307|0308|0309|0310|
|0311|0312|0313|0314|0315|0316|0317|0318|0319|0320|
|0321|0322|0323|0324|0325|0326|0327|0328|0329|0330|
|0331|0332|0333|0334|0335|0336|0337|0338|0339|0340|
|0341|0342|0343|0344|0345|0346|0347|0348|0349|0350|

FIG. 13 (a)

| | | | | | | | | | |
|---|---|---|---|---|---|---|---|---|---|
|0251|0252|0253|0254|0255|0256|0257|0258|0259|0260|
|0261|0262|0263|0264|0265|0266|0267|0268|0269|0270|
|0271|0272|0273|0274|0275|0276|0277|0278|0279|0280|
|0281|0282|0283|0284|0285|0286|0287|0288|0289|0290|
|0291|0292|0293|0294|0295|0296|0297|0298|0299|0300|
|0301|0302|0303|0304|0305|0306|0307|0308|0309|0310|
|0311|0312|0313|0314|0315|0316|0317|0318|0319|0320|
|0321|0322|0323|0324|0325|0326|0327|0328|0329|0330|
|0331|0332|0333|0334|0335|0336|0337|0338|0339|0340|
|0341|0342|0343|0344|0345|0346|0347|0348|0349|0350|

FIG. 13 (b)

PRIOR ART

ARTICLE SORTING EQUIPMENT

BACKGROUND OF THE INVENTION

1. Field of the Invention

The present invention relates to an article sorting system for sorting during conveyance of an article.

2. Description of the Related Art

Conventionally, various sorting systems have been developed and disclosed in a logistics industry (see, for example Japanese Unexamined Patent Application Publication No. 2009-249121). A sorting system 100 is provided with a plurality of slats (article supporters) 18 on which articles 16 are placed and conveyed, and shoes (article lateral pushers) 20 attached to the slats 18 (FIGS. 14, 15).

The slats 18 are attached to endless chains 14. The endless chains 14 are looped between a drive sprocket 12a and a driven sprocket 12b. A motor is attached to the drive sprocket 12a. The drive sprocket 12a is rotated by the motor, so that the endless chains 14 are rotated.

Each of the slats 18 is directed in an orthogonal direction to the conveying direction of the articles 16. A moving roller 24 and a side roller 26 are provided between the slat 18 and the endless chains 14. When the endless chains 14 are rotated, the moving roller 24 is moved along a slat rail 28. The side roller 26 is guided by a lateral guide surface 30.

Each of the shoes 20 is provided with an upper part 34 on the side of a placement surface 32, a lower part 36 on the opposite side of the upper part, and a side part 38 connecting the upper part 34 and the lower part 36. The shoe 20 is encircling in a sectional view orthogonal to the conveying direction, and is attached so as to encircle part of the slat 18. When each of the articles 16 is placed on the placement surface 32, the shoe 20 is arranged on one of ends of the slat 18. The upper part 34 laterally pushes the article 16. The lower part 36 is used for moving the shoe 20 along the slat 18. A rotation shaft 42 is provided in the lower part 36, and a guide roller 44 is attached to the rotation shaft 42 so as to be freely rotated.

The sorting system 100 is provided with a plurality of branch guide portions 102 in FIG. 16 in order to move the shoe 20. Each of the branch guide portions 102 is provided with forward guide rails 50, a movement guide rail 52, and a distributing means 104. An electromagnet 56 is provided in the distributing means 104. The guide roller 44 is provided with a magnetic body. When the electric power is supplied to the electromagnet 56, the electromagnet 56 attracts the guide roller 44. The guide roller 44 is guided to the movement guide rail 52, so that the shoe 20 is moved along the slat 18. At this time, the shoe 20 laterally pushes the article 16 in the orthogonal direction to the conveying direction. When the article 16 is laterally pushed, the article 16 is moved to a branch conveyor 48.

When the electric power is not supplied to the electromagnet 56, the guide roller 44 goes forward along the forward guide rails 50. The shoe 20 is not moved along the slat 18.

A method for determining a moving distance of the article 16 by a pulse encoder 106 in order to decide whether or not the electric power is supplied to the electromagnet 56 is adopted in JP-A-2009-249121. The pulse encoder 106 is attached to a rotation shaft of the driven sprocket 12b. A moving distance of the endless chains 14 is calculated based on the pulses counted up by the pulse encoder 106. The moving distance of the article is calculated based on the pulses after the article 16 passes through a predetermined position P1. When this calculation obtains a distance indicating that the article 16 reaches a predetermined position P2 of the electromagnet 56, the electric power is supplied to the electromagnet 56 (FIG. 17). The shoe 20 is moved along the slat 18, so that the article 16 is laterally pushed relative to the conveying direction.

However, there is sometimes a case where a calculation result of the moving distance of the article 16 is different from an actual moving distance due to extension of the endless chains 14. Even when correction of the pulses or the like is performed, it is not perfect. When the moving distance of the article 16 cannot be precisely obtained, there is a fear that the article 16 might not be sorted at a predetermined position. By moving the non-predetermined shoe 20, there is sometimes a case where an accident happens.

The shoe 20 is arranged on the end of the slat 18, and moved along the slat 18 when laterally pushing the article 16. For example, supposing that two articles 16b, 16c are conveyed as in FIG. 18(a), and all the shoes 20 are placed on one ends of the slats 18. When the rear article 16c is sorted at first, the shoes 20 which already laterally pushed the article 16c are positioned on the other ends (FIG. 18(b)). Next, the front article 16b is sorted. At this time, the article 16b is directed in an oblique direction relative to the conveying direction, and the article 16b is jut out onto the surrounding slats. When the article 16b is continuously laterally pushed (FIG. 18(c)), the article 16b is nipped by the shoes 20. This may lead to an accident that the article 16b and the shoes 20 are damaged. With consideration for this, an interval between the articles cannot be shortened, so that sorting efficiency for the articles is lowered.

When the calculation result of the moving distance of the article 16 is different from the actual moving distance due to the extension of the endless chains 14, a desired shoe cannot be moved. In order to sort the article 16, there is also a need for reliably moving the desired shoe 20.

Further, when the shoe 20 is damaged, the article 16 cannot be sorted. For example, when the guide roller 44 of the shoe 20 is damaged, the distributing means 104 cannot select the rails 50, 52. When the upper part 34 of the shoe 20 is normal, damage to the shoe 20 cannot be recognized at first glance. Therefore, the damage to the shoe 20 is overlooked, so that the article 16 cannot be sent to the desired branch conveyor 48. Since the article 16 cannot be branched, the article 16 is returned to the upstream side by a rejection conveyor, and the article 16 is sorted again.

When the position of the shoe 20 is not obtained as described above, it takes time to find out the damaged shoe 20, so that restoration takes time. The sorting efficiency for the article 16 is lowered.

SUMMARY OF THE INVENTION

It is therefore an object of the present invention to provide an article sorting system for reliably laterally pushing an article at a predetermined point. One of other objects of the present invention is to provide an article sorting system for preventing an accident that an article is nipped by shoes so as to increase sorting efficiency for the article. One of other objects of the present invention is to provide an article sorting system capable of discovering damage to shoes at an early stage so as to prevent an abnormality in sorting an article.

In a first preferred aspect of the present invention, an article sorting system includes a rotation drive device, an endless chain rotated along a conveyance route of an article by the rotation drive device, a plurality of article supporters attached to the endless chain, the article supporters having band shape article placement surfaces and detected units, an article lateral pusher attached to the article supporter, the article lateral pusher being capable of being moved along the article supporter so as to push the article, and a detection device provided in a moving route of the detected units, the detection device for detecting passage of the detected units.

In a second preferred aspect of the article sorting system according to the present invention, the rotation drive device is rotated, and the endless chain is rotated on the conveyance route. The article supporters are attached to the endless chain, and the article supporters accordingly go round. The article is placed on the article supporters, and the article is conveyed. At a branch point during conveyance, the article lateral pusher laterally pushes the article. In order to obtain positions of the article supporters, the detected units are attached to the article supporters, and the detection device for the detected units is provided.

In a third preferred aspect of the present invention, an article sorting system includes a rotation drive device, an endless chain rotated along a conveyance route of an article by the rotation drive device, a plurality of article supporters attached to the endless chain, the article supporters having band shape article placement surfaces, an article lateral pusher attached to the article supporter, the article lateral pusher being capable of being moved along the article supporter so as to push the article, a forward guide rail for moving the article lateral pusher forward along a conveying direction, a movement guide rail for moving the article lateral pusher along the article supporter, a means for distributing the article lateral pusher into the forward guide rail or the movement guide rail, and a confirmation device provided on a downstream side in the conveying direction relative to the movement guide rail, the confirmation device for confirming that the article lateral pusher is moved along the article supporter.

In a fourth preferred aspect of the article sorting system according to the present invention, the rotation drive device is rotated, and the endless chain is rotated on the conveyance route. The article supporters are attached to the endless chain, and the article supporters accordingly go round. The article is placed on the article supporters, and the article is conveyed. At a branch point during conveyance, the article lateral pusher laterally pushes the article. In order to obtain positions of the article supporters, the detected units are attached to the article supporters, and a detection device for detected units is provided. The confirmation device confirms that the article lateral pusher is moved.

In a fifth preferred aspect of the present invention, an article sorting system includes a rotation drive device, an endless chain rotated along a conveyance route of an article by the rotation drive device, a plurality of article supporters attached to the endless chain, the article supporters having band shape article placement surfaces, an article lateral pusher attached to the article supporter, the article lateral pusher being capable of being moved along the article supporter so as to push the article, a forward guide rail for moving the article lateral pusher forward along a conveying direction, a movement guide rail for moving the article lateral pusher along the article supporter, a means for distributing the article lateral pusher into the forward guide rail or the movement guide rail, and a determination device for detecting passage or non-passage of the article lateral pusher so as to determine whether or not the article lateral pusher is damaged.

In a sixth preferred aspect of the article sorting system according to the present invention, the rotation drive device is rotated, and the endless chain is rotated on the conveyance route. The article supporters are attached to the endless chain, and the article supporters accordingly go round. The article is placed on the article supporters, and the article is conveyed. At a branch point during conveyance, the article lateral pusher laterally pushes the article. The determination device detects the passage or the non-passage of the article lateral pusher so as to determine whether or not the article lateral pusher is damaged.

Advantages of the Invention

In the present invention, detected plates are respectively attached to the article supporters, and the detected plates are detected by the detection device, so that the positions of the article supporters can be obtained. Even when the endless chain is extended, pulses are not counted up as in a conventional example. Thus, the article lateral pusher of the desired article supporter can be moved. The article can be branched at a predetermined position.

Blocking of light by the detected units is utilized so as to obtain the positions of the article supporters. Thus, a configuration is simple and failure is not easily caused. The detected units in the article supporters are positioned in such a manner that the same positions do not continue. Thus, the present invention can be applied to high-speed conveyance.

In the present invention, detected plates are respectively attached to the article supporters, and the detected plates are detected by the detection device, so that the positions of the article supporters can be obtained. Even when the endless chain is extended, the positions of the article supporters are not mistaken. The article lateral pusher moved along the article supporter can be confirmed, and possibility of nipping the article can be determined. Nipping of the article can be preliminarily avoided. Since the nipping of the article can be preliminarily avoided, an interval between the articles can be shortened, so that the sorting efficiency for the article can be increased.

In the present invention, detected plates are respectively attached to the article supporters, and the detected plates are detected by the detection device, so that the positions of the article supporters can be obtained. Even when the endless chain is extended, the positions of the article supporters are not mistaken. When detecting whether or not there is the article lateral pusher, detection of an incorrect article lateral pusher can be prevented. By detecting the article lateral pusher, whether or not the article lateral pusher is damaged is determined, so that an abnormality in sorting the article can be prevented.

For a full understanding of the present invention, reference should now be made to the following detailed description of the preferred embodiments of the invention as illustrated in the accompanying drawings.

BRIEF DESCRIPTION OF THE DRAWINGS

FIG. 5($b$) is a top view showing the detection device;

FIG. 13(a) is a table made by the computer based on data from a determination device;

FIG. 13(b) is a table made by the computer based on the data from the determination device, the table in which usability of shoes is indicated by color by selection of an operator;

DESCRIPTION OF THE PREFERRED EMBODIMENTS

Figure 1:
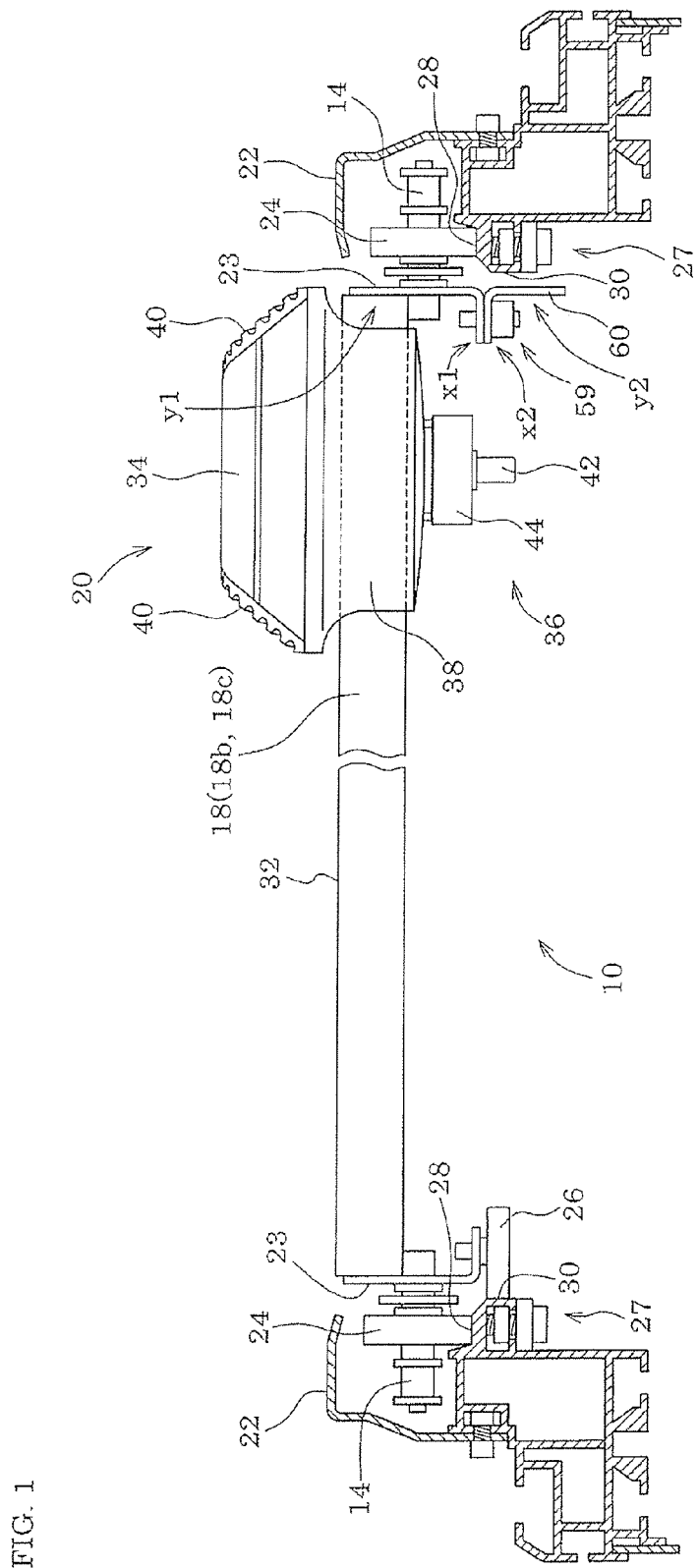
FIG. 1 is a view showing a detected plate in an article sorting system of the present invention.

The preferred embodiments of the present invention will now be described with reference to FIGS. 1-18 of the drawings. Identical elements in the various figures are designated with the same reference numerals.

An article to be conveyed is a rectangular parallelepiped or a regular hexahedron in description. The article includes a package.

Figure 2:
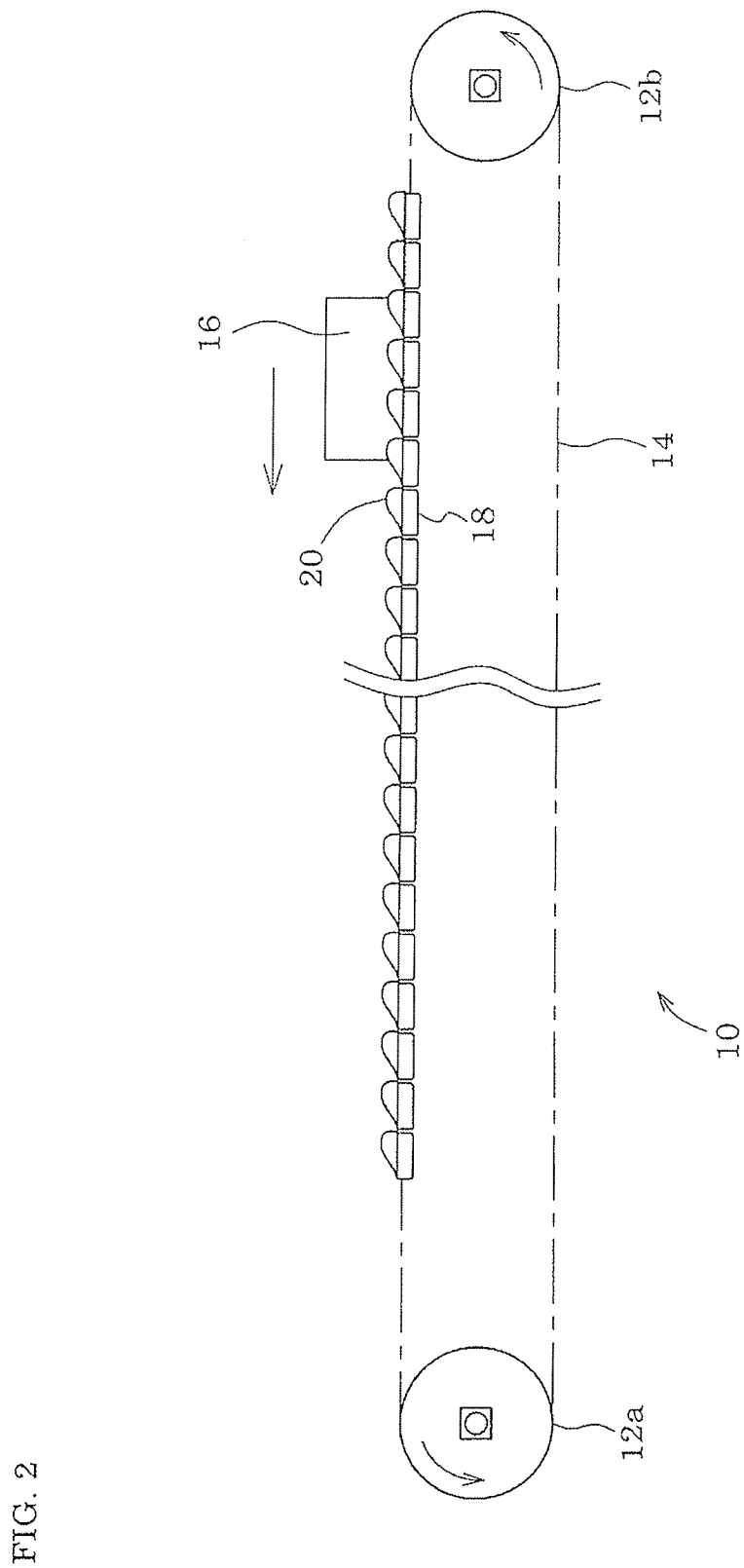
FIG. 2 is a view showing conveyance of an article.

An article sorting system 10 of the present invention shown in FIGS. 1 and 2 is provided with a rotation drive device 12a, endless chains 14 rotated on a conveyance route, a plurality of slats (article supporters) 18 on which articles 16 are placed and conveyed, and shoes (article lateral pushers) 20 attached to the slats 18.

The rotation drive device 12a is a drive sprocket or the like. Hereinafter, the drive sprocket is denoted by the reference numeral 12a. A motor is used as a drive source of the drive sprocket 12a. The drive sprocket 12a is rotated by the motor. A driven sprocket 12b is provided so as to have a predetermined gap from the drive sprocket 12a. The drive sprocket 12a and the driven sprocket 12b respectively serve as both ends of the conveyance route.

The endless chains 14 are meshed with the drive sprocket 12a and the driven sprocket 12b. When the drive sprocket 12a spins, the endless chains 14 are rotated along the conveyance route. In order to prevent a contact accident with the rotated endless chains 14, covers 22 are provided around the endless chains 14.

Each of the slats 18 is attached to the endless chains 14. The two endless chains 14 are provided, and one of the slat 18 is connected to a first endless chain 14 and the other slat 18 is connected to a second endless chain 14. Since the endless chains 14 are rotated on the conveyance route, the slat 18 accordingly goes round the conveyance route.

Side brackets 23 are respectively attached to both ends of the slat 18. The side brackets 23 have a plate shape and are bent so that a section in the conveying direction has an L shape. This L shape includes a horizontal part x1 in the same direction relative to a placement surface 32, and an orthogonal part y1 in the orthogonal direction relative to the placement surface 32. An end of the orthogonal part y1 is attached to the end of the slat 18 by inserting, screwing, welding or the like. A movement roller 24 and a side roller 26 are attached to each of the side brackets 23. In the slat 18, a detected plate 60 is attached in place of at least one side roller 26. As described later, the detected plate 60 is to obtain a position of the slat 18.

In order to support the slat 18, frames 27 are provided. Each of the frames 27 is provided with a slat rail 28 on which the movement roller 24 is moved, and a lateral guide surface 30 for guiding the side roller 26. The frames 27 are formed by an extruded aluminum material. The covers 22 are attached to the frames 27. The movement rollers 24 and the side rollers 26 stabilize going-around of the slat 18.

Figure 6:
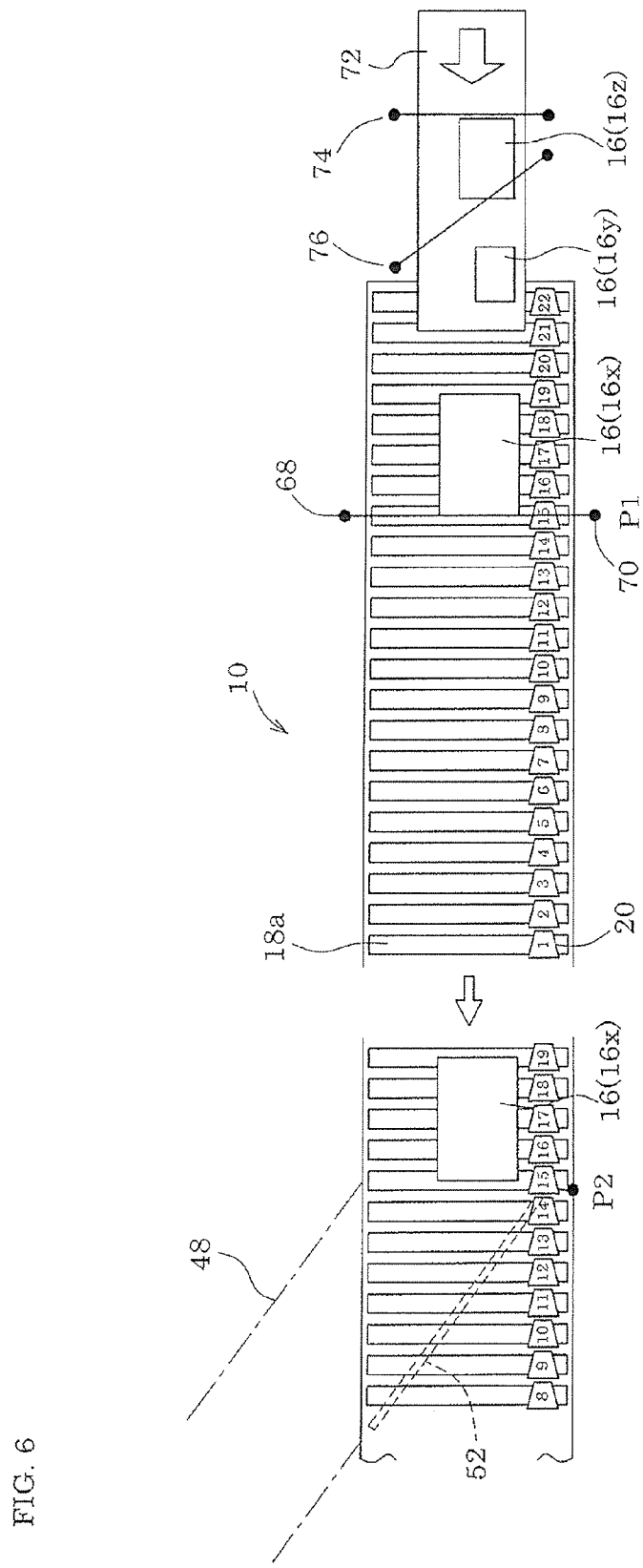
FIG. 6 is a view showing a process from placing of the article on the slats to branching.

The slat 18 has the article placement surface 32 formed in a band shape. The longitudinal direction of the slat 18 is the orthogonal direction relative to the conveying direction of the articles 16 (FIG. 6). There is sometimes a case where a groove in a longitudinal direction is provided in the placement surface 32. The plurality of slats 18 are aligned in the conveying direction. Since the width of the slat 18 is normally narrower than each of the articles 16, the article 16 is placed over the plurality of slats 18. The end of the slat 18 is a band shape end in the description.

Each of the shoes 20 is provided with an upper part 34 on the side of the placement surface 32, a lower part 36 on the opposite side of the upper part, and a side part 38 connecting the upper part 34 and the lower part 36. The shoe 20 encircles in a sectional view orthogonal to the conveying direction, and is attached so as to encircle part of the slat 18. When the article 16 is placed on the placement surface 32, the shoe 20 is arranged on one of the ends of the slat 18. The shoe 20 can be moved along the slat 18.

The upper part 34 of the shoe 20 is provided with a surface 40 inclined relative to the conveying direction. This inclined surface 40 pushes the article 16 toward the side relative to the conveying direction. The lower part 36 of the shoe 20 is provided with a rotation shaft 42, and a guide roller 44 attached to the rotation shaft 42. The guide roller 44 goes forward or obliquely relative to the conveying direction. When the guide roller 44 goes obliquely, the shoe 20 is moved along the slat 18.

Figure 3:
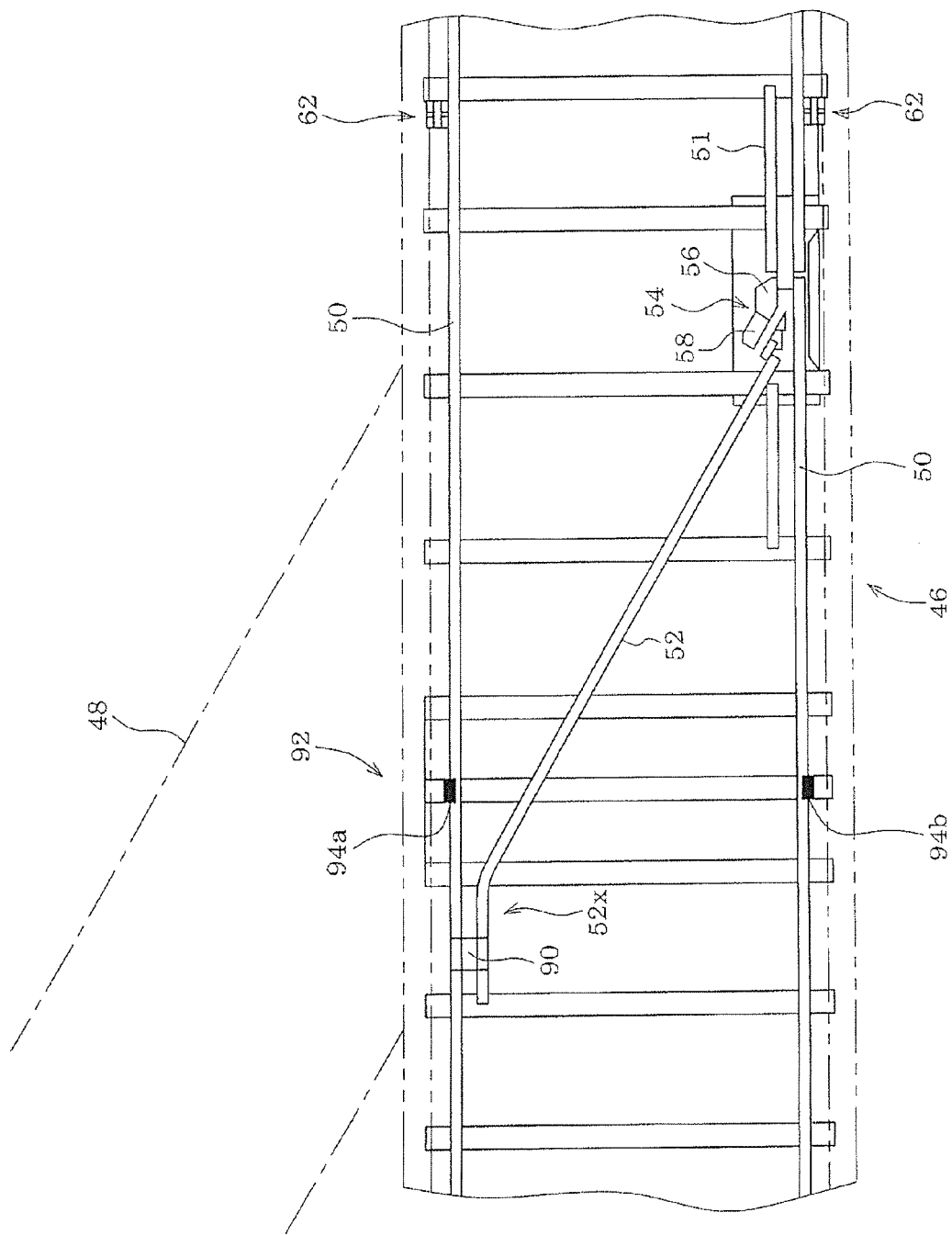
FIG. 3 is a view showing a branch guide portion provided with a detection device.

A plurality of branch guide portions 46 are provided in order to sort the article 16 (FIG. 3). In each of the branch guide portions 46, the shoe 20 pushes the article 16, so that the article 16 can be guided to a branch conveyor 48. The shoe 20 may go forward, so that the article 16 is not branched.

Two kinds of rails serving as tracks of the guide roller 44 are provided in the branch guide portion 46. These rails are forward guide rails 50 for moving the guide roller 44 forward along the conveying direction, and a movement guide rail 52 for moving the guide roller 44 obliquely relative to the conveying direction.

The forward guide rails 50 are provided on the both sides of the conveyance route. The forward guide rails 50 are also provided in parts other than the branch guide portion 46 so as to serve as a pair of rails along the conveying direction. The movement guide rail 52 is directed obliquely relative to the conveying direction. An introduction rail 51 aligned in parallel to the forward guide rails 50 is provided on an upstream side of a unit for distributing 54 (hereinafter referred to as a distributing means 54) for selectively distributing the shoes 20 (the article lateral pushers) into the forward guide rail 50 so that the guide roller 44 is guided by the distributing means 54, and the guide roller 44 passes through therebetween.

A material of the guide roller 44 includes a magnetic body. The distributing means 54 is provided in order to select a trajectory of the guide roller 44. The distributing means 54 is a device for attracting the guide roller 44 with an electromagnet 56 and a permanent magnet 58. The electromagnet 56 partly faces one of the forward guide rails 50 so as to be gradually brought away from the forward guide rail 50. The permanent magnet 58 is continuous to the electromagnet 56, and extends up to an end of the movement guide rail 52.

When the electric power is supplied to the electromagnet 56 and the electromagnet 56 attracts the guide roller 44, the guide roller 44 is guided to the movement guide rail 52 through the permanent magnet 58. When the electric power is not supplied to the electromagnet 56, the electromagnet 56 does not attract the guide roller 44, and the guide roller 44 goes forward along the forward guide rail 50. Since the electromagnet 56 is used, the rails can be instantaneously switched for branching.

Since the guide roller 44 is moved obliquely along the movement guide rail 52, the shoe 20 is moved along the slat 18, and pushes the article 16 from the side. The article 16 is gradually moved to the end of the slat 18, and moved to the branch conveyor 48 provided on the side of the slat 18.

It should be noted that in order to return the moved shoe 20 to an original position, a rail on which the guide roller 44 can be moved between the two forward guide rails 50 is provided in a back run of the conveyance route, and the shoe 20 is returned to the original position by the rail. When the article 16 is placed on the slat 18, the shoe 20 is arranged on the determined end of the slat 18.

In order to determine whether or not the electric power is supplied to the electromagnet 56, there is a need for detecting that the desired shoe 20 comes to the distributing means 54. Therefore, in the present invention, the detected plate 60 is attached to the side bracket 23 attached to the end of the slat 18 as described above, and detection devices 62 for detecting this detected plate 60 are provided. The position of the slat 18 is obtained based on timing when the detected plate 60 is detected.

The detected plate 60 is provided on an end on the opposite side of the placement surface 32. Since the detected plate is provided on the end, the detected plate does not disturb movement of the shoe 20. For example, the detected plate 60 is provided at a position where the side roller 26 is conventionally arranged. The detected plate 60 has a plate shape, and a flat surface thereof is placed in the same direction relative to the conveying direction and directed in a vertical direction relative to the placement surface 32.

As shown in FIG. 1, the detected plate 60 is bent so that a section thereof has an L shape. This L shape includes a horizontal part x2 in the same direction as the placement surface 32, and an orthogonal part y2 in the orthogonal direction relative to the placement surface 32. The orthogonal part y2 is utilized for detection. The horizontal part x1 is threaded, the horizontal part x1 of the side bracket 23 and the horizontal part x2 of the detected plate 60 are overlapped with each other, and the detected plate 60 is attached to the side bracket 23 by a bolt 59. Instead of threading the horizontal part x1, a nut may be used. The detected plate may be attached by welding instead of the bolt 59, or may be fixed by providing claws or holes in the horizontal part x1 and the horizontal part x2 so as to be hanged or fitted to each other. A fixing method thereof is not particularly limited. Further, the side bracket 23 is not necessarily bent into an L shape but a section thereof may be an I shape. An end of the side bracket 23 to which the slat 18 is not attached is used as the detected plate 60. Any configurations are the same as the configuration that a plate having a flat surface placed in the same direction relative to the conveying direction and directed in the vertical direction relative to the placement surface 32 is attached to the end of the slat 18.

Figure 4:
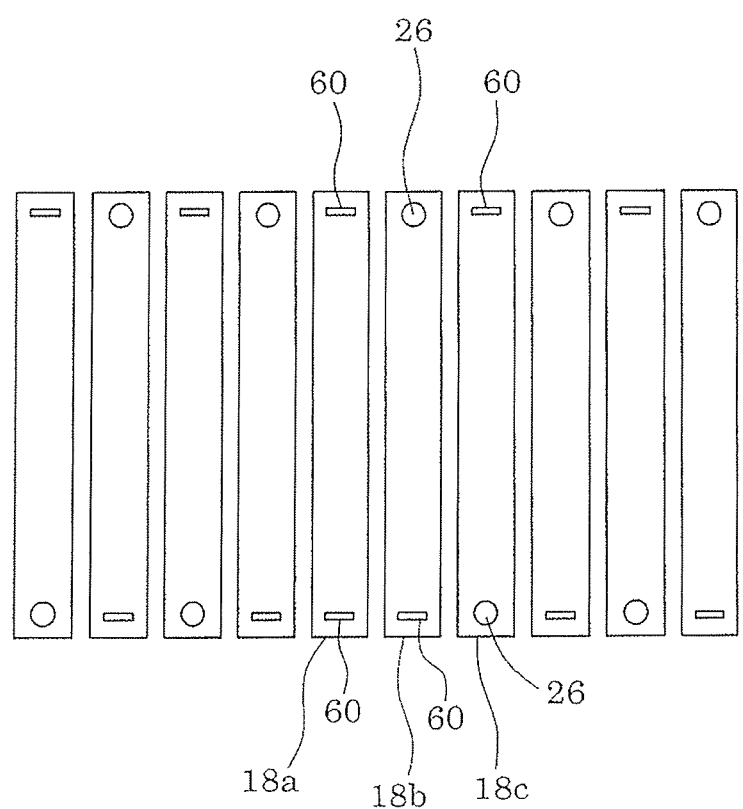
FIG. 4 is a view showing a positional relationship between slats and detected plates.
Figure 5:
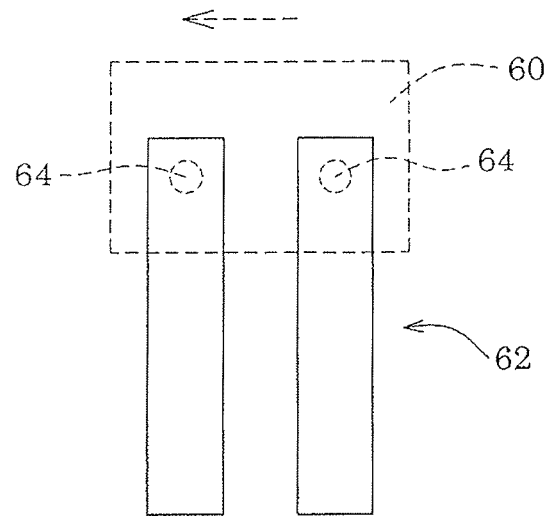
FIG. 5($a$) is a side view showing the detection device.
Figure 5:
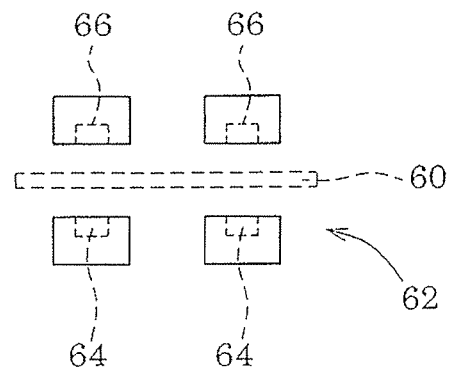

As shown in FIG. 4, the detected plates 60 are provided on both ends of one slat 18a, and the detected plate 60 is provided in one end or the other end of other slats 18b, 18c. The slat 18a provided with the detected plates 60 on both the ends serves as a reference. When the detected plates 60 of the reference slat 18a are detected by the detection devices 62, the detected plates 60 are counted up from the beginning. Counting is repeated for every time when the slat 18 goes round.

It should be noted that in a case where there is no particular distinction between the slats in the description, the reference numerals 18a, 18b, 18c are taken as the reference numeral 18 in the description. The slats are numbered successively along the conveying direction starting from the slat 18a as one. These numbers are common to the shoes 20 attached to the slats 18 and the detected plates 60.

The slat 18b having the detected plate 60 on one end and the slat 18c having the detected plate 60 on the other end are alternately aligned. The slat 18b is provided with the side roller 26 on the other end. The slat 18c is provided with the side roller 26 on one end. Since one detection device 62 does not continuously detect the detected plates 60 on the same ends, there is extra time for the detection. Thus, the present invention can be applied to high-speed conveyance of the article 16.

The detection devices 62 are provided on the upstream side in the conveying direction relative to the distributing means 54. The introduction rail 51 is provided in parallel to the forward guide rails 50 on the upstream side of the distributing means 54, and the detection devices 62 are arranged on an upstream end of the introduction rail 51. This is to distribute the shoes 20 after the detected plates 60 are detected. A distance between the detection devices 62 and the distributing means 54 is determined with consideration for time for detecting the detected plates 60, conveyance speed of the article 16, power supply time to the electromagnet 56, and the like. Since the plurality of branch guide portions 46 are provided, the detection devices 62 are provided for each of the distributing means 54.

The two detection devices 62 are provided on a moving route of the detected plates 60. As shown in FIG. 1, the detected plates 60 are provided on the side of the ends of the slat 18 relative to the guide roller 44. Thus, in FIG. 3, the detection devices 62 are provided on the outer side of the conveyance route relative to the forward guide rails 50. The detection devices are arranged so as to detect the two detected plates 60 of the reference slat 18a at the same time. Since the slats 18 are directed in the orthogonal direction relative to the conveying direction, the two detection devices 62 are arranged on an orthogonal line relative to the conveying direction. Since the number of the detected plates 60 differs between the reference slat 18a and other slats 18b, 18c, the reference slat 18a can be distinguished from other slats 18b, 18c.

The detection devices 62: (a) detect the detected plates 60; (b) count up the detected plates 60; and (c) send a counted value to the distributing means 54. The width of the slat 18, an interval between the slats 18, and the distance from the detection devices 62 to the distributing means 54 are determined at the time of designing, and these values are not changed. By these values, the number of the slats 18 from the detection devices 62 to the distributing means 54 is determined. The counted value of the detected plates 60 is sent to the distributing means 54, and the number of the slats 18 is subtracted from the counted value. By this subtraction, the distributing means 54 obtains a number of the slat 18 reaching the distributing means 54. Since the pulse is not used unlike a conventional example, displacement of the slats 18 is not easily generated.

In a case where the above subtraction is performed, a result may be zero or a minus number. The total number of the slats 18 is determined at the time of designing. In a case of zero, the result is set to be the total number of the slats 18. In a case of a minus number, a value of the minus number is subtracted from the total number of the slats 18.

Each of the detection devices 62 is provided with light-emitting means 64 for emitting light and light-receiving means 66 for receiving light (FIGS. 5(a) and 5(b)). The light-emitting means 64 use a laser diode or a light-emitting diode. The light-receiving means 66 use a photo diode or a photo transistor. The light-emitting means 64 and the light-receiving means 66 face each other at a fixed interval. Each of the detected plates 60 passes through between the light-emitting means 64 and the light-receiving means 66 (FIG. 5(b)).

The light emitted by the light-emitting means 64 is received by the light-receiving means 66. When the detected plate 60 passes through between the light-emitting means 64 and the light-receiving means 66, the light toward the light-receiving means 66 is blocked. By this light blocking, passage of the detected plate 60 can be detected.

The two light-emitting means 64 and the two light-receiving means 66 of the detection device 62 are aligned in the conveying direction. The detection device 62 detects the detected plate 60 twice. By a time lag of the light blocking at the light-receiving means 66, the moving direction of the detected plate 60 is obtained. In a case where the detected plate 60 is moved in a forward direction relative to the conveying direction, one is added for every time when the detected plate 60 is detected. For every time when the reference slat 18a is detected, addition is performed taking the reference slat 18a as one. In a case where the detected plate 60 is moved in the opposite direction relative to the conveying direction, one is subtracted for every time when the detected plate 60 is detected. Since the total number of the slats 18 has been determined, a number of the slat 18 next to the detected reference slat 18a is taken as the total number, and then subtraction from the total number is performed. Even when the slat 18 is moved in the opposite direction for some reasons, the position of the slat 18 can be precisely recognized.

An interval between the light-receiving means 66 is fixed. By the time lag of the light blocking at the two light-receiving means 66, moving speed of the detected plate 60 can also be detected. As described later, various controls are performed by a computer, and whether or not the slat 18 is moved at predetermined speed can be confirmed.

A light-emitting means 68 and a light-receiving means 70 for detecting that an article 16x passes through a predetermined position P1 after the article 16x is loaded on the slat 18 are provided (FIG. 6). The light-emitting means 68 and the light-receiving means 70 may be the same as the light-emitting means and the light-receiving means of the above detection devices 62. The article 16x is detected by the light blocking. The above detection devices 62 are provided at the predetermined position. It is found that the article 16x is placed on the slat 18 having a number of the counted value obtained when the article 16x is detected.

In a case where an identification mark such as a bar code is applied to the article 16x, a reading means for the identification mark is provided at the above predetermined position.

Not only the article 16x and the slat 18 are matched, but also the content of the article 16x placed on the slat 18 can further be matched.

Before articles 16y, 16z are placed on the slat 18, the articles 16y, 16z are conveyed by a carry-in conveyor 72. The carry-in conveyor 72 is provided with photoelectric switches 74, 76 for measuring width and length of the article 16z. The photoelectric switch 74 emitting light by 90° relative to the conveying direction and the photoelectric switch 76 emitting light obliquely relative to the conveying direction are used. Based on conveying speed and light blocking time of the photoelectric switches 74, 76, the width and the length of the article 16z are calculated. The width and the length of the article 16z are calculated, so that the number of the shoes 20 when the article 16z is moved to the branch conveyor 48 can be determined.

As means for determining the width and the length of the article 16z, in addition to use of the photoelectric switches 74, 76, the article 16 may be photographed by a digital camera and the width and the length of the article 16z may be determined by image processing. It should be noted that in a case where there is no particular distinction between the articles in the description, the reference numerals 16x, 16y, 16z are taken as the reference numeral 16 in the description.

Figure 7:
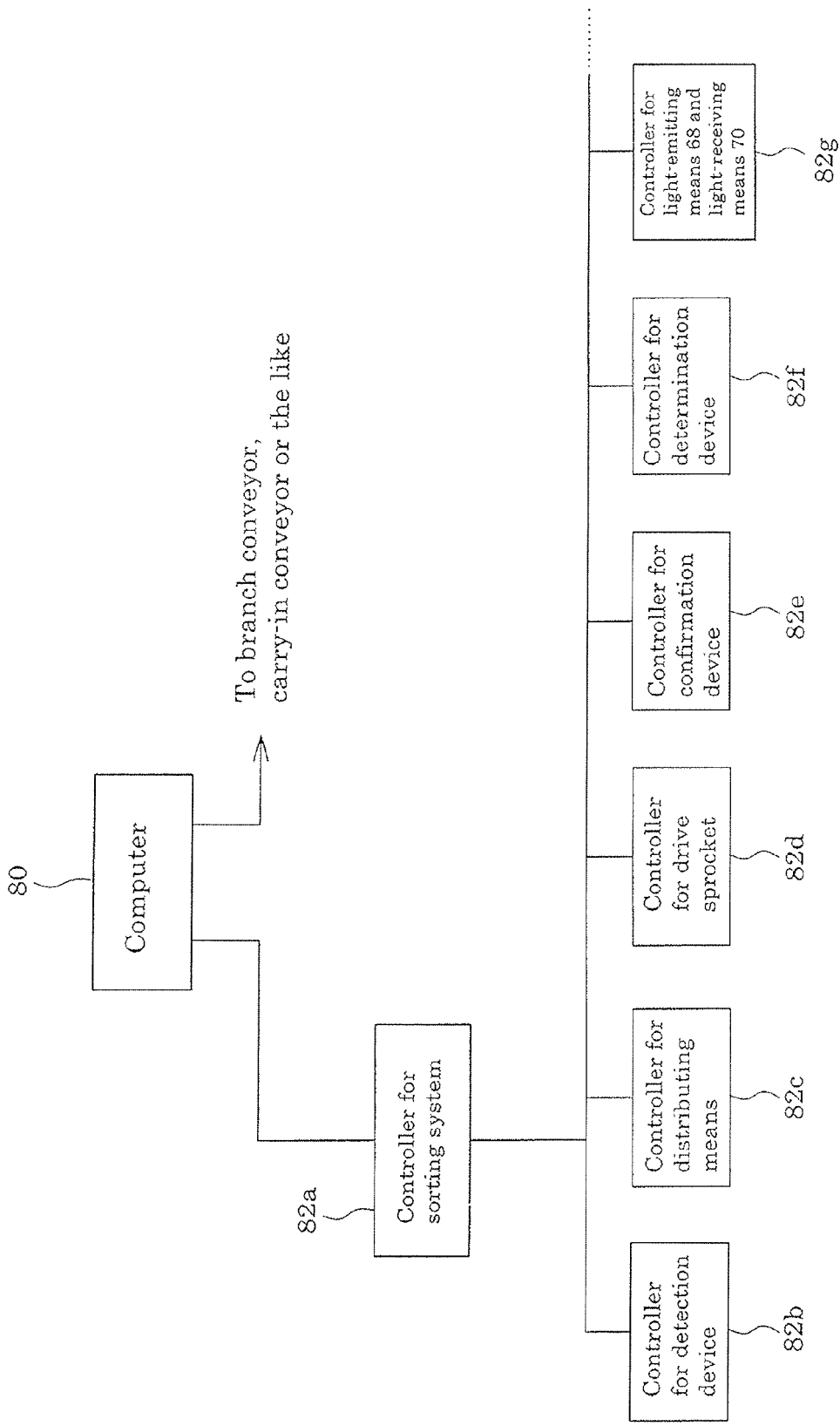
FIG. 7 is a view showing communication connection between a computer and controllers.

A computer 80 for controlling operations of the above means such as the detection devices 62, the distributing means 54, and the drive sprocket 12a is provided (FIG. 7). The computer 80 is operated as below by software, hardware, or both of the software and the hardware.

The computer 80 communicates with a controller 82a for controlling the sorting system 10. This controller 82a communicates with controllers 82b, 82c, 82d of the detection devices 62, the distributing means 54, and the drive sprocket 12a. The controllers 82a, 82b, 82c, 82d may be programmable logic controllers (PLCs). Since there are the plurality of detection devices 62 and the plurality of distributing means 54, the controllers 82b, 82c are provided for each pair of the detection devices 62 and each of the distributing means 54.

The detection devices 62 and the like are driven based on commands from the computer 80. For example, the distributing means 54 for branching and a number of the slat 18 on which the article 16 is placed are sent from the computer 80 to the controller 82a. A number of the slat 18 is sent from the controller 82a to the controller 82c of the distributing means 54. The distributing means 54 is capable of supplying the electric power to the electromagnet 56 by a predetermined number.

Drive states of the detection devices 62 and the like are sent to the computer 80, and displayed on a monitor of the computer 80. For example, a number of the slat 18 detected by the detection devices 62 is sent. The computer 80 may determine a number of the slat 18 reaching the distributing means 54 from a number of the slat 18 by the above method, or may determine the conveying speed or the conveying direction of the article 16 from the time lag of the light blocking of the light-receiving means 70. The number of the shoes 20 at the time of branching is determined from size of the sent article 16 or the like.

It should be noted that the commands may be directly sent from the computer 80 to the controllers 82a, 82b, 82c, 82d of the means. The computer 80 may collectively control other devices such as the branch conveyor 48.

Next, operations of the article sorting system 10 will be described. (1) The articles 16y, 16z are moved from the carry-in conveyor 72 onto the slat 18. In the carry-in conveyor 72, the size of the article 16z or the like is measured.

(2) The article 16*x* moved to the slat 18 is conveyed along the conveyance route. The article 16*x* is detected at the predetermined position P1 immediately after conveyance is started, and at that time, the detected plate 60 is also counted up. The article 16*x* is placed on the slat 18 of the counted value, and the article 16*x* is related to the slat 18. In a case where the identification mark such as the bar code is applied, the identification mark is read.

(3) A number of the slat 18 on which the article 16*x* is placed is sent from the computer 80 to the controller 82*c* of the distributing means 54 of the branch guide portion 46 for branching the article 16*x* via the controller 82*a*.

(4) The detection devices 62 count up for every time when the detected plates 60 are detected, and send the counted value to the distributing means 54. In a case where the article is conveyed in the forward direction relative to the conveying direction, a number is increased for every time when the detected plates 60 are detected. For every time when the detected plates 60 of the reference slat 18*a* are detected, the counted value is reset, and a number is increased from the beginning.

As described above, the distributing means 54 subtracts the predetermined number from the counted value. A number of the slat 18 reaching the position P2 of the electromagnet 56 of the distributing means 54 is recognized.

(5) When it comes to a predetermined number for laterally pushing the article 16*x*, the distributing means 54 supplies the electric power to the electromagnet 56. Since the electric power is supplied, the guide roller 44 in the lower part 36 of the shoe 20 is guided to the movement guide rail 52. The shoe 20 is moved along the slat 18. The shoe 20 pushes the article 16*x* and the article 16*x* is guided to the branch conveyor 48.

When the electric power is not supplied to the electromagnet 56, the guide roller 44 is moved along the forward guide rails 50. The shoe 20 is not moved along the slat 18.

As described above, in the present invention, the slat 18 can be individually managed by the detected plates 60 attached to the slat 18. Position displacement of the slat 18 at the time of branching is not easily generated, and reliable branching can be performed. Since a position of the detected plate 60 is alternately changed for each of the slats 18, there is extra time for detection and processing. Thus, the present invention can be applied to the high-speed conveyance.

Figure 8:
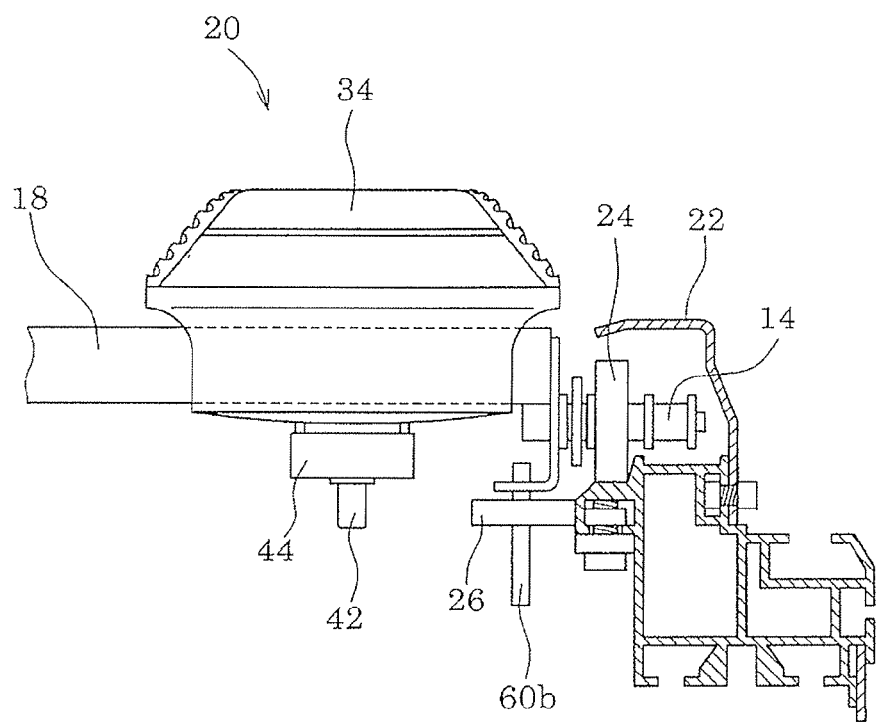
FIG. 8 is a view in which a rotation shaft of a side roller is extended as a detected unit.

Although an embodiment of the present invention is described above, the present invention is not limited to the above embodiment. For example, by extending a conventional rotation shaft to which the side roller 26 is attached, a rotation shaft 60*b* protruding from the side roller 26 serves as a substitute of the detected plate 60 (FIG. 8). In this case, the side rollers 26 are provided on both the ends of the slat 18. In addition, a shape and the like are not limited as long as the detected plate can block the light as a detected unit.

The position at which the detected plate 60 is attached is not limited to the end of the slat 18. The position may be any position as long as the conveyance of the article 16, movement of the slat 18, and movement of the shoe 20 are not disturbed.

Although the movement of the shoe 20 is described in the above embodiment, the present invention is to confirm that the shoe 20 is moved. Therefore, in the present invention, a confirmation device 90 for confirming that the shoe 20 is moved along the slat 18 is provided (FIG. 3). A configuration other than confirmation of the movement of the shoe 20 is the same as the configuration described above, and description thereof will be omitted.

Figure 9:
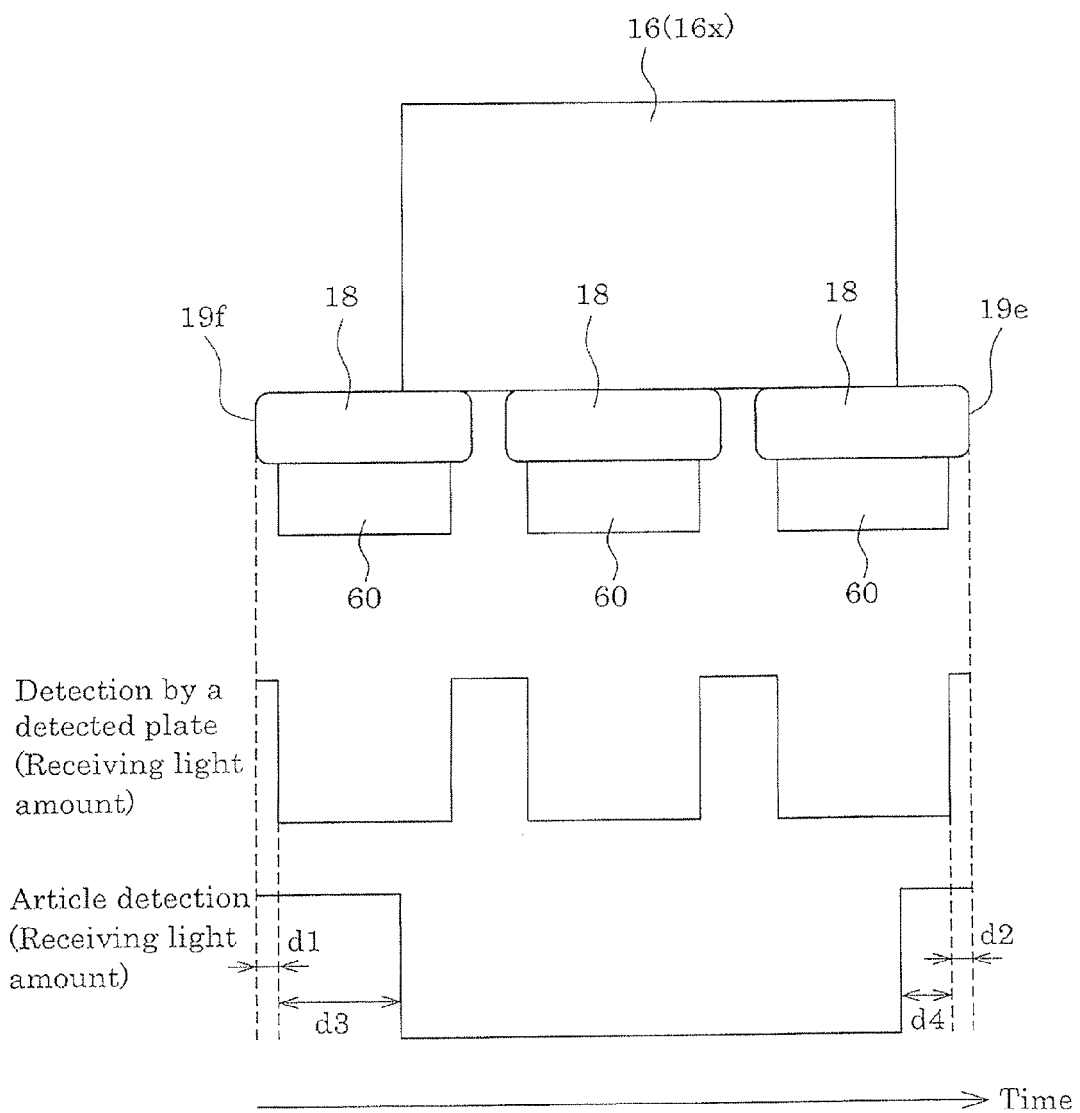
FIG. 9 is a view showing timing when the article and the detected plates are detected.
Figure 10:
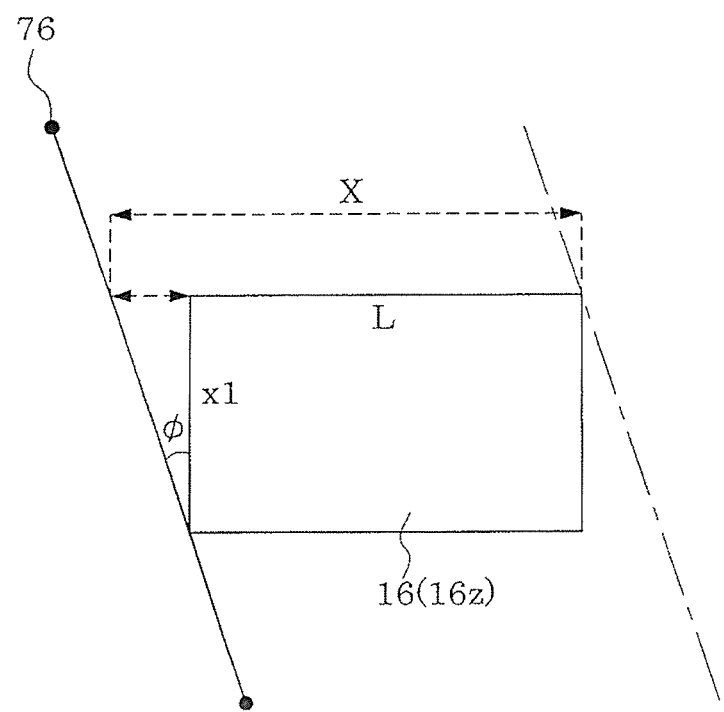
FIG. 10 is a view showing a configuration for determining a width of the article.
Figure 11:
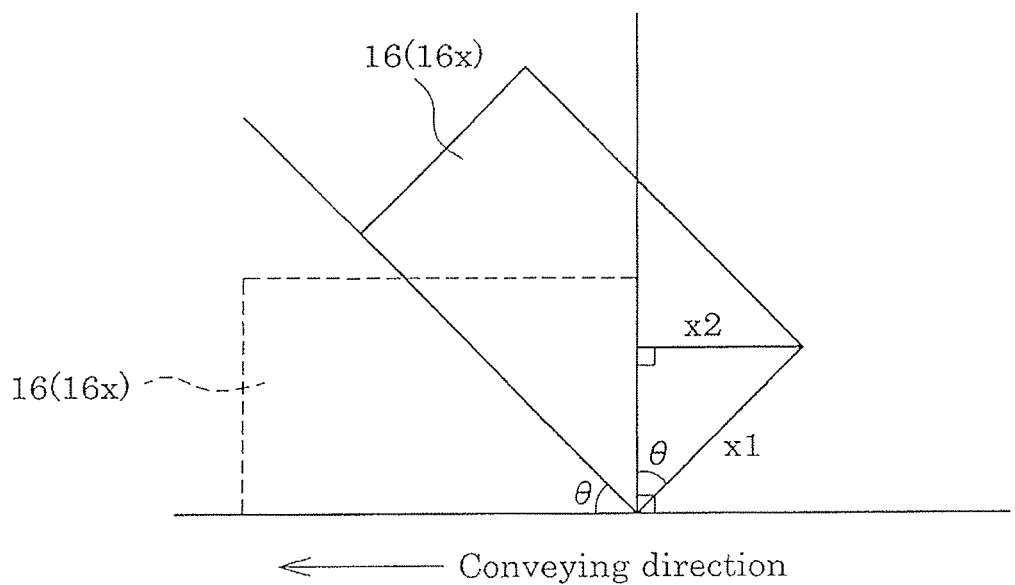
FIG. 11 is a view showing an expansion length of the article at the time of laterally pushing the article.
Figure 12:
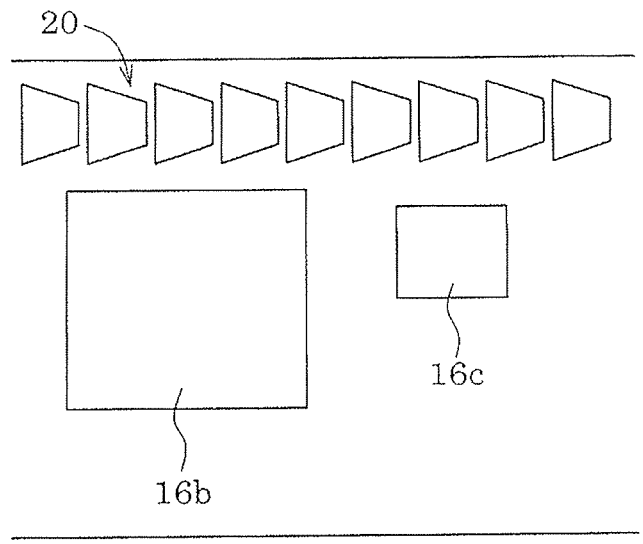
FIG. 12(a) is a view before the branching of the article.
FIG. 12(b) is a view in which the front article is branched at first.
Figure 12:
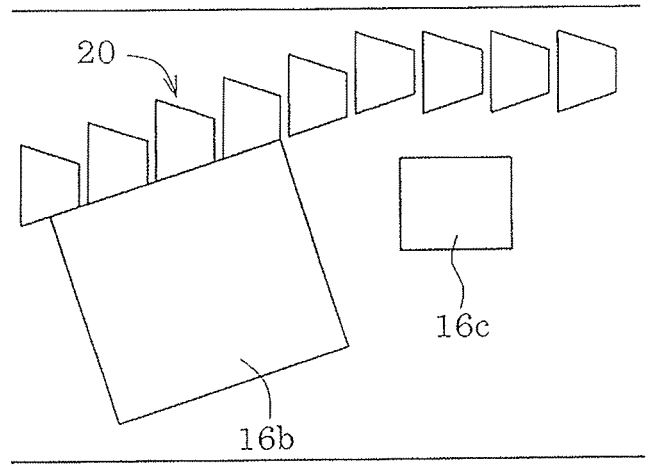
Figure 14:
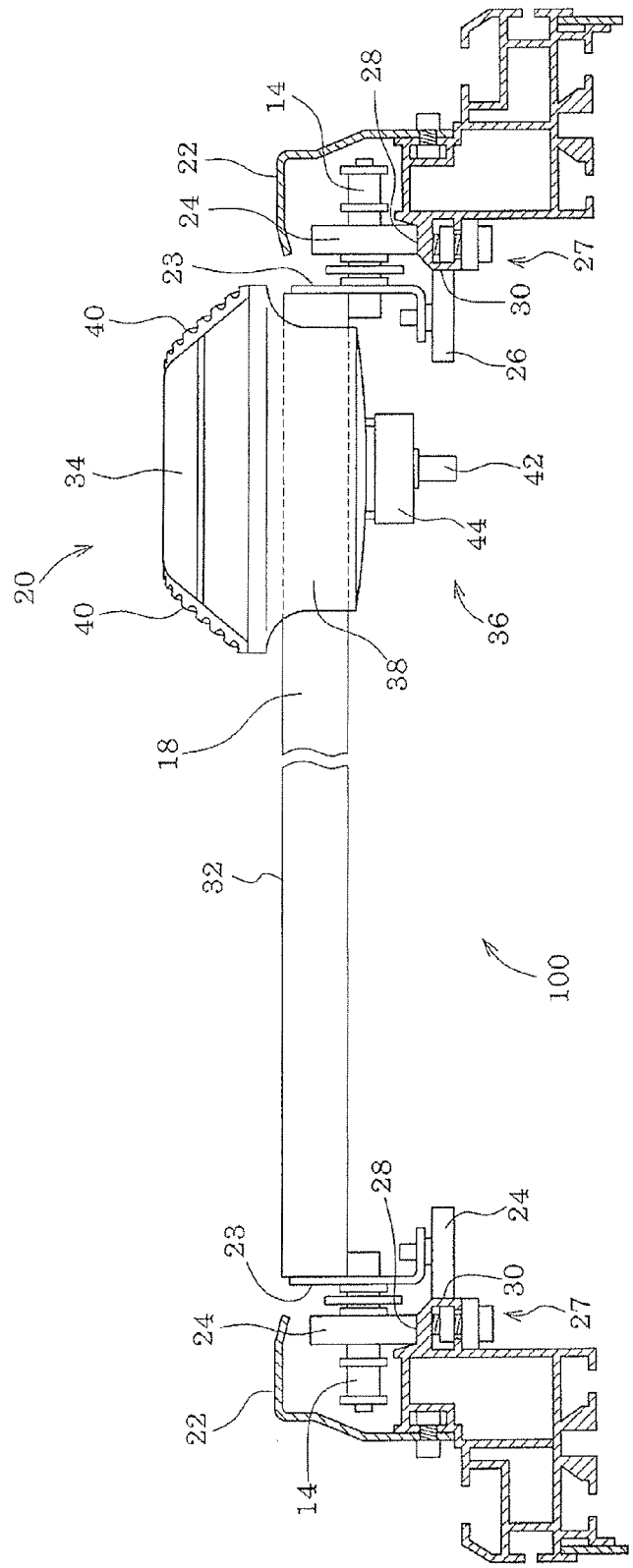
FIG. 14 is a view showing a slat and a shoe in a conventional article sorting system.
Figure 15:
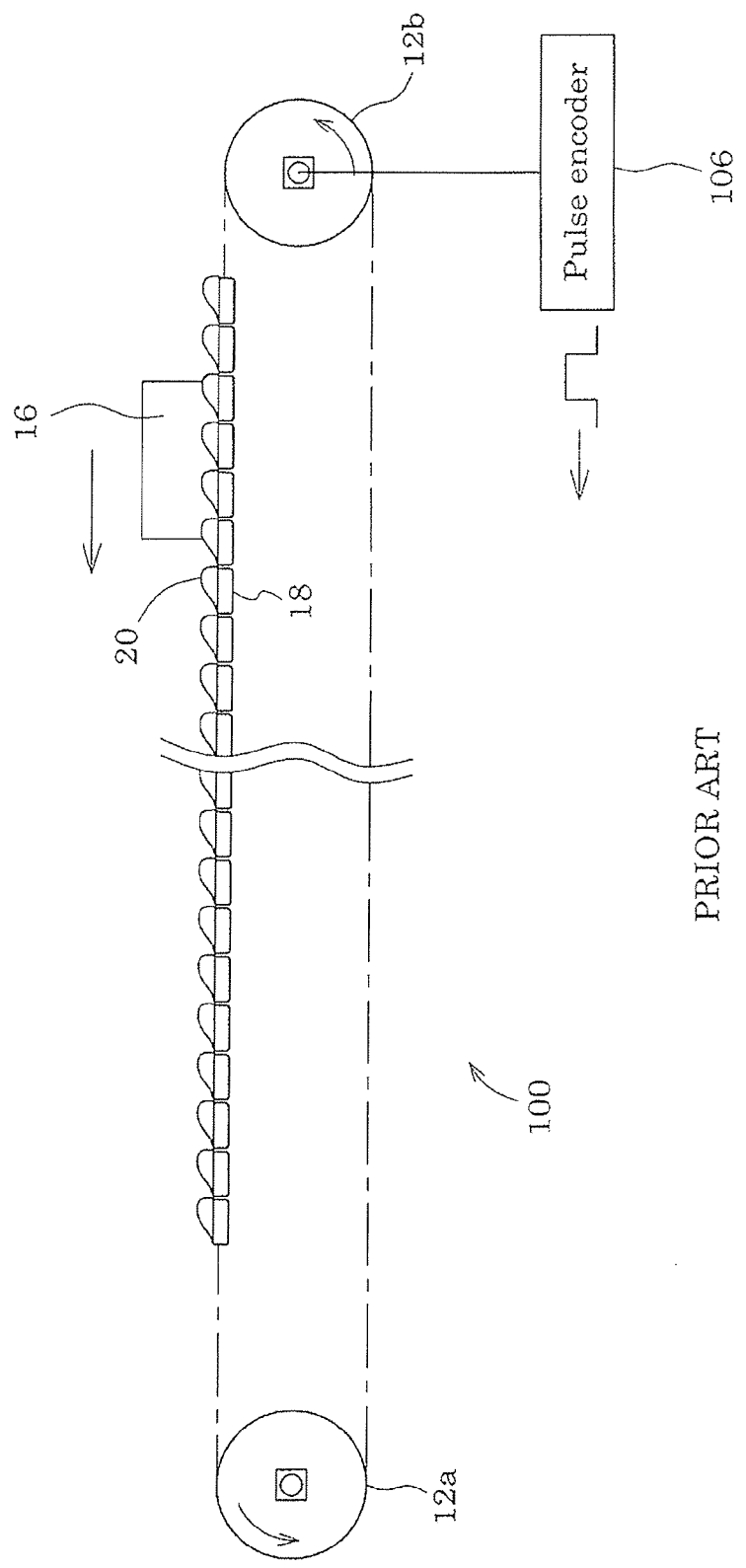
FIG. 15 is a view showing conveyance of a conventional article.
Figure 16:
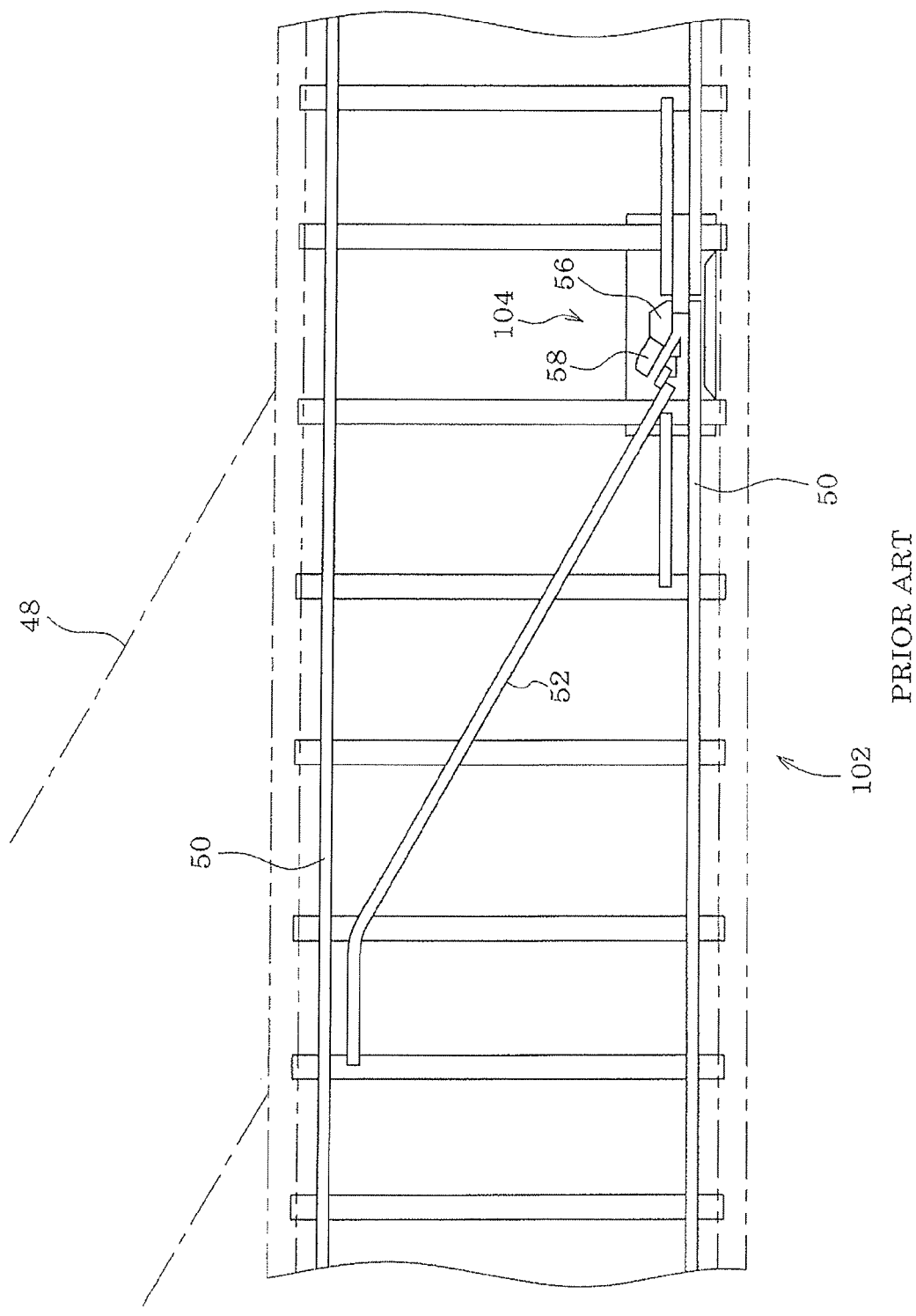
FIG. 16 is a view showing a conventional branch guide portion.
Figure 17:
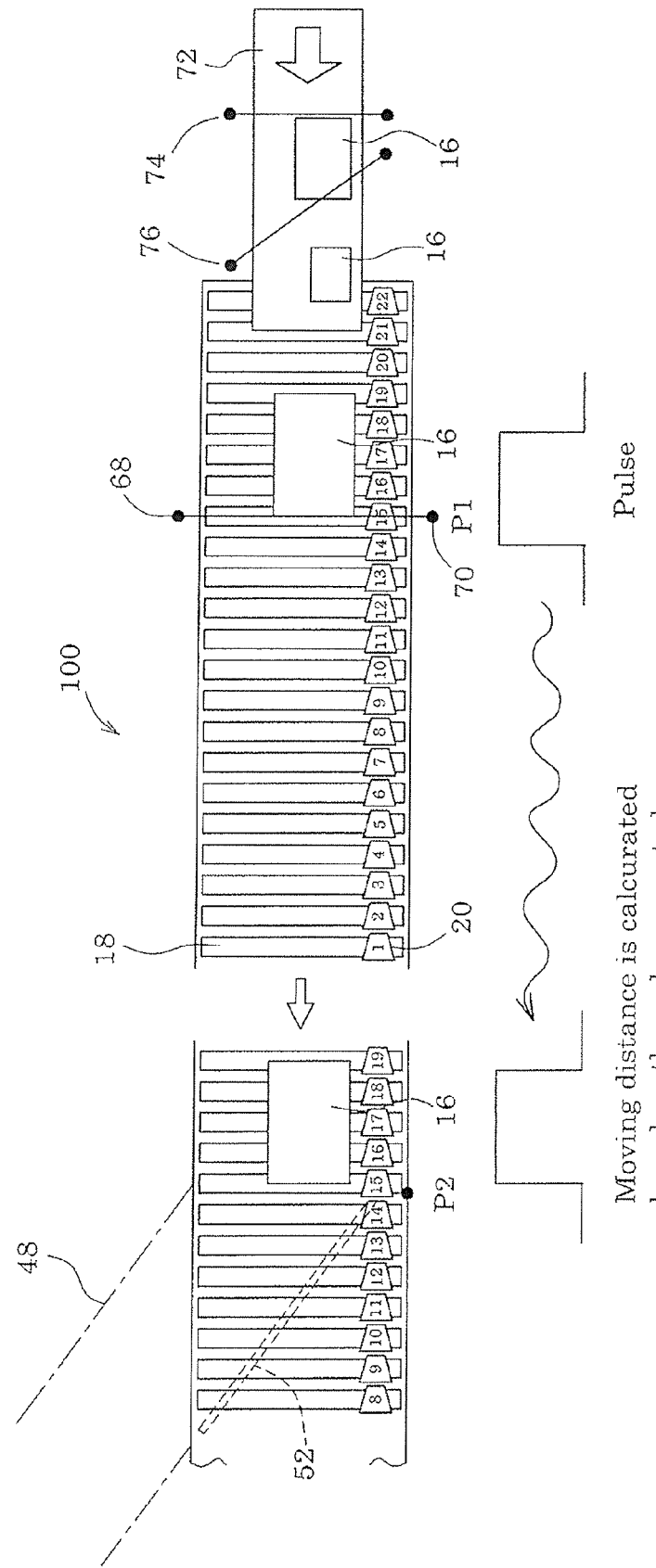
FIG. 17 is a view in which a conventional pulse is counted up and the article is branched.
Figure 18:
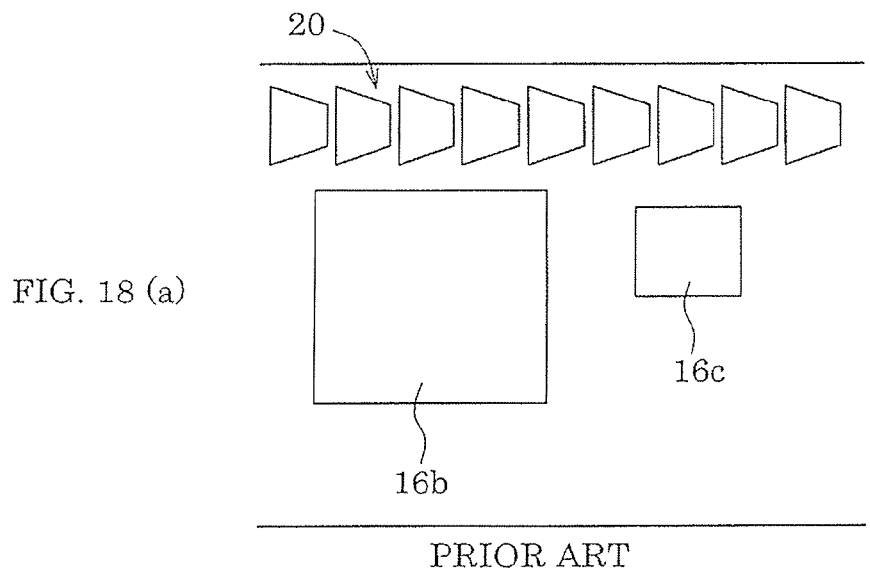
FIG. 18(a) is a view in which the article is sorted by a conventional sorting system before branching.
FIG. 18(b) is a view in which the article is sorted by a conventional sorting system after the rear article is branched.
FIG. 18(c) is a view in which the article is sorted by a conventional sorting system during branching of the front article.
Figure 18:
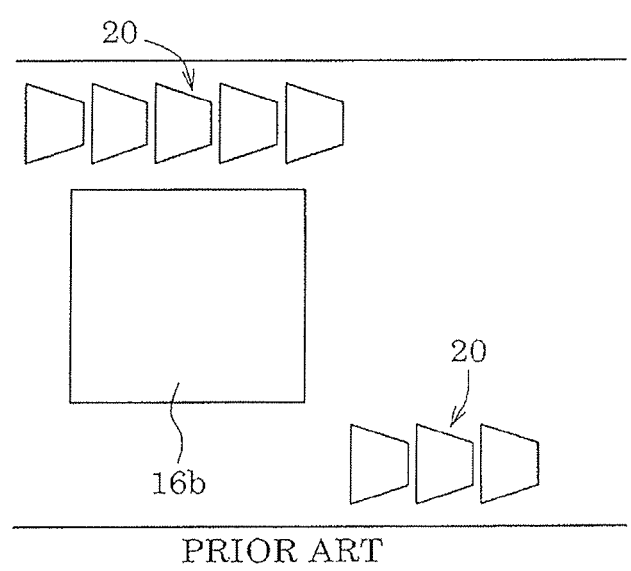
Figure 18:
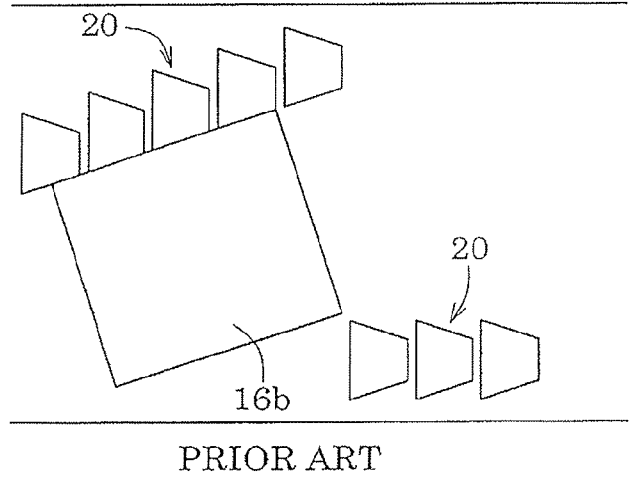

FIG. 9 shows a temporal change of a receiving light amount at the time of detecting the article 16*x* at the predetermined position P1 and a light receiving amount at the time of detecting the detected plate 60 after the articles 16*y*, 16*x* are firstly placed on the slat 18. The downstream side in the conveying direction of the slat 18 is one side 19*f*, and the upstream side in the conveying direction is the other side 19*e*.

Length d1 from the one side 19*f* of the slat to the detected plate 60 and length d2 from the other side 19*e* to the detected plate 60 are determined at the time of designing. From a difference of timing when the conveying speed and the light receiving amounts are changed, distances d3 and d4 from the detected plate 60 to the article 16 are determined. Based on these values d1, d2, d3, d4, length (d1+d3) from the one side 19*f* of the slat 18 to a front end of the article 16*x*, and length (d2+d4) from the other side 19*e* of the slat 18 to a rear end of the article 16*x* are determined.

As described above, the slats 18 on which the articles 16*x* are placed and the positions thereof are found. Since numbers of the slats 18 on which the articles 16*x* are placed are found, the number of the slats 18 between the articles is found by performing subtraction of that numbers. The size of the slat 18 and the interval between the slats 18 are determined at the time of designing. From the number of the slats 18 between the articles and the positions of the slats 18 on which the articles 16*x* are placed, an interval between the articles can be determined.

A positional relationship between the article 16*x* and the slat 18 and the interval between the articles described above are determined by sending the timing of blocking the light to the computer as described later. This is used for determining whether or not the article 16*x* can be branched.

In a case where the identification mark such as the bar code is applied to the article 16*x*, the reading means for the identification mark is provided at the above predetermined position P1. Not only the article 16*x* and the slat 18 are matched, but also the content of the article placed on the slat 18 can further be matched.

The confirmation device 90 detects the rotation shaft 42 of the shoe 20 or the guide roller 44 so as to confirm the movement of the shoe 20. The confirmation device 90 is arranged in a moving route of the rotation shaft 42 or the guide roller 44. Since there is the plurality of branch guide portions 46, the confirmation device 90 is provided for each of the movement guide rails 52. In order to confirm the movement of the shoe 20, the confirmation device 90 is provided on the downstream side in the conveying direction relative to the movement guide rail 52. For example, the confirmation device is provided at a position of a terminal guide rail 52*x* provided on a downstream end of the movement guide rail 52.

A method for detecting the rotation shaft 42 of the shoe 20 or the guide roller 44 may be a contact or non-contact method. For example, a photoelectric switch provided with a light-emitting means and a light-receiving means is utilized. The light-emitting means is a laser diode or a light-emitting diode. The light-receiving means is a photo diode or a photo transistor. The light emitted by the light-emitting means is received by the light-receiving means. When the light passes through between the forward guide rails 50 and the terminal guide rail 52*x* and the light is blocked by the rotation shaft 42 or the guide roller 44, passage of the shoe 20 is detected. In this case, openings or cutouts are provided in the forward guide rails 50 and the terminal guide rail 52*x*, and the light-emitting means and the light-receiving means are installed so that the light passes through the openings or the cutouts.

The width of the slat 18 and the interval between the slats 18 are determined at the time of designing as described above, and further, a distance from the detection devices 62 to the confirmation device 90 is also determined. Based on these values, the number of the slats 18 from the detection devices 62 to the confirmation device 90 is determined. When this number of the slats 18 is subtracted from the counted value by the detection devices 62, the result is a number of the slat 18 reaching the confirmation device 90. It should be noted that in a case where the subtracted value is zero or a minus number, the same as a case of the above distributing means 54 is applied.

The value obtained by counting up the detected plates 60 is sent from the detection devices 62 to the confirmation device 90, and the confirmation device 90 subtracts the number of the slats 18 from the counted value. A number of the slat 18 at the time of detecting the shoe 20 is found. Whether or not the desired shoe 20 is moved along the slat 18 is found. Further, which end of the slat 18 the shoe 20 of the slat 18 is placed is also found.

As described in the above embodiment, before the articles 16y, 16z are placed on the slat 18, the articles 16y, 16z are conveyed by the carry-in conveyor 72. Based on the conveying speed and the light blocking time of the photoelectric switches 74, 76, the width and the length of the article 16z are calculated. The width and the length of the article 16z are calculated, so that the number of the shoes 20 when the article 16z is moved can be determined.

Specifically, length L of the article 16z is determined based on the light blocking time of the photoelectric switch 74 and the conveying speed. As in FIG. 10, the photoelectric switch 76 is used so as to determine width x1 of the article 16z. Length X is determined from the light blocking time of the photoelectric switch 76 and the conveying speed. An angle of the light of the photoelectric switch 76 to the article is $\phi$. Therefore, a relationship "X=L+x1 tan $\phi$" is established. Since the values X, L, and $\phi$ are already found, the width x1 of the article 16 can be determined.

As means for determining the width and the length of the article 16z, in addition to the use of the photoelectric switches 74, 76, the article 16 may be photographed by a digital camera and the width and the length of the article 16 may be determined by the image processing. It should be noted that in a case where there is no particular distinction between the articles in the description, the reference numerals 16x, 16y, 16z are taken as the reference numeral 16 in the description.

An angle of the article 16x relative to the conveying direction at the time of laterally pushing the article 16x is determined at the time of designing. When the width of the article 16x is found, expansion length of the article 16x is found, and a possibility of nipping the article 16x by the shoes 20 is determined by calculation. For example, as in FIG. 11, when lateral width of the article 16x is x1, and the angle of the article 16x relative to the conveying direction is $\theta$, expansion length x2 of the article 16x is x1 sin $\theta$.

The computer also communicates with a controller for controlling the confirmation device 90 and a controller 82g of the light-emitting means 68 and the light-receiving means 70. The controllers 82e, 82g communicate with the controllers 82b, 82c, 82d, 82e, 82f of the detection devices 62 and the like. These controllers 82e, 82g may be PLCs. Since there is the plurality of confirmation devices 90, the controller 82e is provided for each of the confirmation devices 90.

Data sent from the confirmation device 90 to the computer 80 includes a number of the shoe 20 whose movement is confirmed by the confirmation device 90. The computer 80 compares numbers of the slat 18 and the shoe 20 between data sent to the distributing means 54 and the data received from the confirmation device 90. By this comparison, whether or not the shoe 20 of the desired slat 18 is moved can be confirmed. On which end of the slat 18 the shoe 20 is placed due to the movement can also be confirmed.

In a case where the shoe 20 of the desired slat 18 is not moved, the fact is notified to an operator by display on the monitor of the computer 80. Alternatively, the computer 80 may be connected to an alarm device so as to trigger an alarm. If necessary, the sorting system 10 is stopped.

As described above, (A) on which end of the slat 18 the shoe 20 is placed is found, (B) a number of the slat 18 on which the article 16 is placed is found, (C) the position of the article 16 of the slat 18 is found, (D) the expansion length x2 of the article 16 is found from the size of the article 16, and (E) the interval between the articles 16 is found. Therefore, when the article 16 is moved to the branch conveyor 48, whether or not the article 16 is nipped by the shoes 20 can be determined.

When the computer 80 determines distribution of the article 16, the computer also determines nipping. Based on the above items (A) to (E), it is determined that when the article 16 is branched, the article 16 is nipped by the shoes 20, a number of the slat 18 on which the article 16 is placed is not sent to the distributing means 54. The article 16 is not branched but moved forward. Even when a number of the slat 18 is already sent to the distributing means 54, a signal for cancelling that number is sent. Based on the size of the article 16 and the interval, the forward guide rails 50 or the movement guide rail 52 to be selected by the distributing means 54 is selected.

For example, in a case where the two articles 16b, 16c are conveyed as in FIG. 12(a), when the rear article 16c is firstly distributed and then the front article 16b is distributed, the front article 16b is nipped by the shoes 20. Thus, the rear article 16c is not distributed but moved forward, and the front article 16b is distributed (FIG. 12(b)).

Next, operations of the article sorting system 10 will be described. After the steps (1) to (5) described above, the sorting system 10 is operated in the order of (6) to (7) below.

(6) After the predetermined shoe 20 is moved along the slat 18, the confirmation device 90 confirms the movement of the shoe 20. When the confirmation device 90 confirms the shoe 20, a value obtained by subtracting the predetermined number from the counted value becomes a number of the confirmed shoe 20. When that number is a number of the shoe 20 instructed to be moved by the computer 80, it is found that the shoe 20 is normally moved. Sorting of the article 16 can be continued in this way.

In a case where a number of the confirmed shoe 20 is not the shoe 20 instructed to be branched, the fact is displayed on the monitor of the computer 80 or the alarm is triggered by the alarm device.

(7) In the computer 80, data describing on which end of the slat 18 the shoe 20 is placed is updated from a number of the confirmed shoe 20. Based on this data, whether or not the article 16 can be branched is determined. When the article cannot be branched, an instruction of the branching is stopped and the instruction is cancelled. The article 16 which cannot be branched is conveyed again from the beginning.

As described above, in the present invention, the slat 18 can be individually managed by the detected plates 60 attached to the slat 18. Further, the shoe 20 moved along the slat 18 can be managed. Since on which end of the slat 18 the shoe 20 is placed can be found by managing the movement, an accident that the article 16 is nipped by the shoes 20 can be prevented.

Alternatively, the movement of the shoe 20 can be managed. Thus, in a case where the unanticipated shoe 20 is moved, a correction work or the like can be promptly performed. The nipping of the article 16 is easily determined. Thus, even when the interval between the articles is shortened, the nipping can be prevented, so that a sorting capability of the article 16 can be improved.

Further, in the present invention, in addition to moving the shoe 20 and confirming the movement, damage to the shoe 20 is determined. Therefore, in the present invention, a determination device 92 for determining the damage to the shoe 20 is provided (FIG. 3). A configuration other than determination of the damage to the shoe 20 is the same as the configuration described above, and description thereof will be omitted.

The determination device 92 is to detect passage or non-passage of the rotation shaft 42 of the shoe 20 or the guide roller 44 so as to determine whether or not the shoe 20 is damaged.

The determination device 92 is provided on the downstream side of the detection devices 62 on the conveyance route. There is the movement guide rail 52 on the downstream side of the detection devices 62. In the present invention, the determination device is provided at a position where there is the movement guide rail 52. With consideration for time for detecting the detected plate 60 by the detection devices 62 and counting up, a distance between the detection devices 62 and the determination device 92 is determined. In FIG. 3, the determination device 92 is provided at a position in the vicinity of the downstream of the movement guide rail 52.

The determination device 92 is provided with a light-emitting means 94a and a light-receiving means 94b. The light-emitting means 94a uses a laser diode or a light-emitting diode. The light-receiving means 94b uses a photo diode or a photo transistor. The light emitted by the light-emitting means 94a is received by the light-receiving means 94b. This light passes through between the two forward guide rails 50 through which the rotation shaft 42 or the guide roller 44 passes. Therefore, openings or cutouts are provided in the forward guide rails 50 and the movement guide rail 52, and the light-emitting means 94a and the light-receiving means 94b are arranged so that the light passes through the openings or the cutouts. This light is blocked by the rotation shaft 42 or the guide roller 44 when the shoe 20 passes. It can be determined by the light blocking that the shoe 20, the lower part 36 of the shoe 20 in particular, is normal. It should be noted that in a case where the determination device 92 is provided at a position where there is not the movement guide rail 52, openings or cutouts are provided only in the forward guide rails 50, so that the light passes through between the two forward guide rails 50.

As described above, the width of the slat 18 and the interval between the slats 18 are determined at the time of designing, and further, the distance from the detection devices 62 to the determination device 92 is also determined. Based on these values, the number of the slats 18 from the detection devices 62 to the determination device 92 is also determined. When this number of the slats 18 is subtracted from the counted value by the detection devices 62, the result is a number of the slat 18 reaching the determination device 92. It should be noted that in a case where the subtracted value is zero or a minus number, the same as a case of the above distributing means 54 is applied.

The counted value of the detected plates 60 is sent from the detection devices 62 to the determination device 92, and the determination device 92 subtracts the number of the slats 18 from the counted value. Since numbers of the slat 18 and the shoe 20 attached to that slat 18 are matched, a number of the shoe 20 when the shoe 20 is detected is found.

The determination device 92 synchronizes timing of the above calculation with timing of the light blocking by the shoe 20. This is for corresponding a normality or an abnormality of the shoe 20 for each of numbers of the shoes 20.

When the rotation shaft 42 of the shoe 20 or the guide roller 44 is detected at the time of the calculation, it is found that the shoe 20 having a number determined by the calculation is normal. In contrast, when the rotation shaft 42 or the guide roller 44 cannot be detected, it is found that the shoe 20 having a number determined by the calculation is abnormal.

Although the timing of the calculation and the timing of the light blocking by the shoe 20 are synchronized, other timing may be synchronized. The timing of detecting the detected plate 60 by the detection devices 62 and the timing of the light blocking by the shoe 20 may be synchronized.

Data of the normality or the abnormality of the shoe 20 is sent to the computer as described later and processed in the computer.

The light-emitting means 68 and the light-receiving means 70 for detecting that the article 16x passes through the predetermined position P1 after the article 16x is loaded on the slat 18 are provided (FIG. 6). The light-emitting means 68 and the light-receiving means 70 may be the same as the light-emitting means and the light-receiving means of the above detection devices 62. The article 16x is detected by the light blocking. The above detection devices 62 are provided at the predetermined position P1. It is found that the article 16x is placed on the slat 18 having a number of the counted value when the article 16x is detected.

As described above, before the article 16x is placed on the slat 18, the articles 16y, 16z are conveyed by the carry-in conveyor 72. Based on the conveying speed and the light blocking time of the photoelectric switches 74, 76, the width and the length of the article 16z are calculated. The width and the length of the article 16z are calculated, so that the number of the shoes 20 when the article 16 is moved is determined.

The computer 80 communicates with the controller 82f for controlling the determination device 92. The controller 82f for controlling the determination device may be a PLC. Since there is the plurality of determination devices 92, the controller 82f is provided for each of the determination devices 92.

Data sent from the determination device 92 to the computer 80 is data indicating the normality or the abnormality for each of the shoes 20. The computer 80 may create a table 96 as shown in FIG. 13(a) based on this data and display the table on the monitor. In this table 96, the normality and the abnormality of the shoes 20 are distinguished by color. In FIG. 13(a), it is found that the abnormality is generated in the shoes 20 of No. 0257, 0258, 0259. The operator can easily distinguish the abnormal shoes 20.

In a case where the abnormality is generated in any of the shoes 20, a signal may be sent from the computer 80 to the alarm device, so that the alarm is triggered.

By selecting the shoes 20 on the table 96, the computer 80 may stop use of the selected shoes 20. The computer 80 also distinguishes the shoes 20 whose use is stopped by color. In FIG. 13(b), since the shoes 20 of No. 0257 and 0258 are selected, those numbers are distinguished by color, and the use of the shoes 20 is stopped.

As described above, based on the data sent to the computer 80, a number of the slat 18 on which the article 16 is placed is found. When the shoe 20 whose use is stopped is included in the shoe 20 of the slat 18 on which the article 16 is placed, the computer 80 does not send a number of the slat 18 to the distributing means 54. The movement of the shoe 20 for branching is not performed, and the article 16 is moved forward. After being moved forward on the conveyance route, the article 16 is returned to the upstream side by a rejection conveyor, and the article 16 is sorted again.

Further, the computer 80 may resume the use of the selected shoe 20 by selecting the shoe 20 whose use is stopped. The shoe 20 whose use is resumed is treated as the same as color of the normality or the abnormality. Selection of the shoe 20 may be performed for each of the shoes 20 or may be collectively performed for the plurality of shoes 20.

Next, operations of the article sorting system 10 will be described. After the steps (1) to (5) described above, the sorting system 10 is operated in the order of (8) to (10) below. The operations of (8) to (10) may be performed at the same time as the operations of (6) to (7).

(8) Whether or not there is the lower part 36 of the shoe 20 is determined by the determination device 92 on the downstream of the detection devices 62 in the conveying direction. The determination device 92 receives the counted value from the detection devices 62 and further detects the rotation shaft 42 or the guide roller 44. The value obtained by subtracting the predetermined number from the counted value is a number of the detected shoe 20. It can be confirmed that the detected shoe 20 having that number is normal. By using the detected shoe 20, the sorting of the article 16x can be continued.

When the counted value is received and predetermined subtraction is performed, and the rotation shaft 42 or the guide roller 44 cannot be detected, it is found that the rotation shaft 42 or the guide roller 44 of the shoe 20 having a number of the subtracted value is damaged and lost.

(9) The data of the normality or the abnormality of the shoe 20 is sent from the determination device 92 to the computer 80. It should be noted that data of the drive states of other devices such as the detection devices 62 and the distributing means 54 is also sent to the computer 80.

(10) The computer 80 uses the received data and creates the table 96 in which the normality and the abnormality of the shoes 20 are distinguished by color. The computer 80 displays the created table 96 on the monitor. In a case where the operator selects a number of the shoe 20 displayed, the computer 80 stops the use of the selected shoe 20.

As described above, by detecting the abnormality of the shoe 20, the abnormality of the sorting of the article 16 can be prevented. The accident during the sorting of the article 16 can also be prevented. Irrespective of extension of the endless chains 14, a number of the abnormal shoe 20 can be properly obtained by the detected plate 60, so that a number error of the abnormal shoe 20 can be prevented.

Although the embodiment according to the present invention is described above, the present invention is not limited to the above embodiment. For example, although the determination device 92 is a non-contact sensor using the light-emitting means 94a and the light-receiving means 94b, the determination device 92 may be a contact type mechanical sensor. When the rotation shaft 42 or the guide roller 44 comes into contact with the mechanical sensor, it is found that the lower part 36 of the shoe 20 is normal.

A position of the determination device 92 is not limited to the downstream side of the detection devices 62. The position may be the upstream side of the detection devices 62. In this case, the calculation performed by the above determination device 92 is addition. That is, a predetermined value is added to the counted value.

There is no need for providing the determination device 92 for each pair of detection devices 62, but at least one determination device is only required to be provided on the conveyance route.

Although the operator selects a number of the shoe 20 after the abnormal shoe 20 is indicated on the table 96 and the use of the shoe 20 having that number is stopped, the computer 80 may automatically stop the use of the abnormal shoe 20.

Although the detection device 62 uses the two light-emitting means 64 and the two light-receiving means 66, the detection device may use one light-emitting means and one light-receiving means. The moving direction of the detected plates 60 is not detected, and the passage of the detected plates 60 is only simply detected. The present invention is not limited to non-contact detection utilizing the light but detection by contact of the detected plates 60 may be performed.

Although the detected plates 60 are detected and counted up by the detection devices 62, a detected signal may be sent to the distributing means 54 and counting may be performed in the distributing means 54. The counting may be performed by the computer 80 and the distributing means 54 may supply the electric power to the electromagnet 56 by a command of the computer 80.

Although the distributing means 54 uses the electromagnet 56, the distributing means may be a switch for mechanically distributing the article into the forward guide rails 50 or the movement guide rail 52.

The article sorting system 10 is not limited to the article sorting system provided with the branch conveyor 48 on one side of the conveyance route but may be provided with branch conveyors 48 on the both sides of the conveyance route. Two movement guide rails 52 cross each other, and distributing means 54 are provided on the both sides thereof. Timing of supplying the electric power to the electromagnet 56 of the distributing means 54 is the same as the above description.

Although the article 16 is inclined relative to the conveyance route at the time of moving the article 16 to the branch conveyor 48, the article 16 may be moved to the branch conveyor 48 while being parallel to the conveyance route. In this case, a plurality of movement guide rails 52 is arranged in parallel, the distributing means 54 is provided for each of the movement guide rails 52, and the electric power is supplied to the electromagnets 56 of the distributing means 54 at the same time. This timing of supplying the electric power is the same as the above description.

A number of the detected plate 60 may be displayed on surfaces of the slat 18, the shoe 20, and the detected plate 60. Thus, the operator can recognize a number of the moving shoe 20.

This application claims priority from Japanese Patent Application Nos. 2010-175404, 2010-175559, and 2010-175621, which are incorporated herein by reference.

There has thus been shown and described a novel article sorting system which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:
1. An article sorting system comprising:
a rotation drive device;
an endless chain rotated along a conveyance route of an article by the rotation drive device;
a plurality of article supporters attached to the endless chain for movement in along the conveyance route by the endless chain, each of the article supporters having band shaped article placement surfaces and at least a first group of the article supporters having a detection plate attached proximate to a first lateral end thereof;

an article lateral pusher attached to the article supporter, the article lateral pusher being movable along the article supporter so as to push an article;

a detection device provided in a moving route of the detected units, the detection device for detecting passage of the detection plates along the conveyance route detecting direction of movement and speed of movement of the plurality of article supporters.

2. The article sorting system according to claim 1, wherein at least a second group of the article supporters are provided with a detection plate proximate a second lateral end thereof.

3. The article sorting system according to claim 2, wherein the first group of the article supporters are alternatingly aligned with the second group of the article supporters in a conveying direction along the conveyance route.

4. The article sorting system according to claim 3, wherein the detection plates are attached a side of the article supporters opposite the placement surfaces.

5. The article sorting system according to claim 4, further comprising:
   a forward guide rail for moving the article lateral pusher forward along the conveying direction;
   a movement guide rail for moving the article lateral pusher along the article supporter; and
   a unit for distributing the article lateral pusher into one of the forward guide rail and the movement guide rail, wherein the detection device is provided on an upstream side in the conveying direction relative to the unit for distributing.

6. The article sorting system according to claim 5, wherein the detection device includes:
   a light-emitting unit for emitting light; and
   a light-receiving unit for receiving the light, and the detection plates are detected based on blocking of the light by the detection plates.

7. The article sorting system according to claim 6, wherein the detection device has two light-emitting units and two light-receiving units, and the conveying direction of the article is determined based on timing when the light toward the light-receiving units is blocked.

8. An article sorting system comprising:
   a rotation drive device;
   an endless chain rotated along a conveyance route of an article by the rotation drive device;
   a plurality of article supporters attached to the endless chain for movement therewith along the conveyance route, the article supporters having band shape article placement surfaces;
   a plurality of article lateral pushers, each of the article lateral pushers being attached to a respective one of the article supporters for movement therewith along the conveyance route, the article lateral pushers being movable in lateral directions transverse to the conveyance route along the article supporter so as to push the article;
   a forward guide rail for moving the article lateral pusher forward along a conveying direction along the conveyance route;
   a movement guide rail for moving selected ones of the article lateral pushers along the article supporter from a first side to a second side of the article supporters;
   a unit for distributing the article lateral pusher into one of the forward guide rail and the movement guide rail;
   a confirmation device provided on a downstream side in the conveying direction relative to the movement guide rail, the confirmation device confirming whether or not the selected ones of the article lateral pushers have moved along the article supporters from the first side to the second side of the article supporter and determining a number of the article lateral pushers that have moved from the first side to the second side of the article supporter.

9. The article sorting system according to claim 8, wherein the article lateral pusher includes:
   a guide roller provided on the opposite side of the placement surface, the guide roller being moved along the forward guide rail or the movement guide rail; and
   a rotation shaft to which the guide roller is attached, and the confirmation device detects passage of the guide roller or the rotation shaft so as to confirm that the article lateral pusher is moved along the article supporter.

10. The article sorting system according to claim 9, further comprising:
    a detection device for detecting the article supporters; and
    a unit for determining whether the article lateral pusher is on one end or the other end of the article supporter based on timing when the detection device detects the article supporter and timing when the confirmation device detects the passage of the guide roller or the rotation shaft.

11. The article sorting system according to claim 10, further comprising:
    a unit for measuring size of the article, wherein the unit for distributing selects the forward guide rail or the movement guide rail into which the article lateral pusher is distributed from a position of the article lateral pusher and the size of the article.

12. An article sorting system comprising:
    a rotation drive device;
    an endless chain rotated along a conveyance route of an article by the rotation drive device;
    a plurality of article supporters attached to the endless chain for movement therewith along the conveyance route, the article supporters having a first side that includes band shape article placement surfaces and a second side opposite the article placement surfaces;
    an article lateral pusher attached to the article supporter, the article lateral pusher being movable along the article supporter so as to push the article, the article lateral pusher including an upper part located on the first side of the article supporters and a member that extends from the second side of article supporters;
    a forward guide rail for moving the article lateral pusher forward along a conveying direction;
    a movement guide rail for moving the article lateral pusher along the article supporter in a direction transverse to the conveyance route from a first lateral side of the article supporter to a second lateral side of the article supporter;
    a unit for distributing the article lateral pusher into one of the forward guide rail and the movement guide rail; and
    a determination device for detecting passage or non-passage of the article lateral pusher from the first lateral side to the second lateral side so as to determine whether or not the article lateral pusher is damaged, the determination device including a light-emitting unit for emitting light and a light-receiving unit for receiving the light, and the member of the article lateral pusher being detected based on blocking of the light by the member.

13. The article sorting system according to claim 12, wherein the member of the article lateral pusher comprises:
    a guide roller provided on the opposite side of the placement surface, the guide roller being moved along the forward guide rail or the movement guide rail; and
    a rotation shaft to which the guide roller is attached, and the determination device detects the passage or the non-passage of the guide roller or the rotation shaft so as to determine whether or not the article lateral pusher is damaged.

14. The article sorting system according to claim 13, further comprising:
  a detection device, and each of the plurality of article supporters includes a detection plate attached proximate one lateral end thereof, and the detection device is configured to detect movement of the detection plates of each of the article supporters, wherein
  the determination device detects the passage or the non-passage of the guide roller or the rotation shaft at timing when the detection device detects one of the detection plates of one of the article supporters so as to determine whether or not the article lateral pusher is damaged.

15. The article sorting system according to claim 14, wherein the article lateral pusher determined to be damaged is excluded from distribution into the one of the forward guide rail and the movement guide rail by the unit for distributing.

16. The article sorting system according to claim 2, wherein one of the article supporters is provided with a detection plate attached proximate a first lateral end thereof and another detection plate attached proximate a second lateral end thereof.

17. The article sorting system according to claim 3, wherein one of the article supporters is provided with a detection plate attached proximate a first lateral end thereof and another detection plate attached proximate a second lateral end thereof.

* * * * *